United States Patent
Junge et al.

(10) Patent No.: US 11,015,123 B2
(45) Date of Patent: May 25, 2021

(54) LIQUID-CRYSTAL MATERIAL

(71) Applicant: MERCK PATENT GMBH, Darmstadt (DE)

(72) Inventors: Michael Junge, Pfungstadt (DE); Ursula Patwal, Reinheim (DE); Ewa Dominica Ptak, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 151 days.

(21) Appl. No.: 16/303,362

(22) PCT Filed: May 16, 2017

(86) PCT No.: PCT/EP2017/061656
§ 371 (c)(1),
(2) Date: Nov. 20, 2018

(87) PCT Pub. No.: WO2017/198637
PCT Pub. Date: Nov. 23, 2017

(65) Prior Publication Data
US 2020/0255741 A1  Aug. 13, 2020

(30) Foreign Application Priority Data
May 20, 2016 (EP) .................... 16170725

(51) Int. Cl.
| G02F 1/1333 | (2006.01) |
| C09K 19/58 | (2006.01) |
| C09K 19/30 | (2006.01) |
| C09K 19/60 | (2006.01) |
| E06B 9/24 | (2006.01) |
| G02F 1/1335 | (2006.01) |
| G02F 1/1337 | (2006.01) |
| G02F 1/1343 | (2006.01) |
| C09K 19/04 | (2006.01) |

(52) U.S. Cl.
CPC ........ *C09K 19/588* (2013.01); *C09K 19/3066* (2013.01); *C09K 19/601* (2013.01); *E06B 9/24* (2013.01); *G02F 1/1337* (2013.01); *G02F 1/13439* (2013.01); *G02F 1/133528* (2013.01); *C09K 2019/0466* (2013.01); *E06B 2009/2417* (2013.01); *E06B 2009/2464* (2013.01)

(58) Field of Classification Search
CPC .............. C09K 19/588; C09K 19/3066; C09K 19/601; C09K 2019/0466; G02F 1/1333; G02F 1/133528; G02F 1/1337; G02F 1/13439; E06B 9/24; E06B 2009/2417; E06B 2009/2464
USPC ................................... 252/299.01
See application file for complete search history.

(56) References Cited

U.S. PATENT DOCUMENTS

| 8,927,856 | B2 | 1/2015 | Debije | |
| 9,388,339 | B2 | 7/2016 | Goebel | |
| 9,701,905 | B2 | 7/2017 | Junge | |
| 2016/0319592 | A1 | 11/2016 | Junge | |
| 2017/0029702 | A1 | 2/2017 | Junge | |
| 2018/0100104 | A1* | 4/2018 | Goebel | .............. C09K 19/3491 |
| 2018/0216006 | A1* | 8/2018 | Engel | ..................... C09K 19/12 |

FOREIGN PATENT DOCUMENTS

| EP | 2722381 A2 | 4/2014 | |
| JP | 60067587 A * | 4/1985 | ............ C09K 19/54 |
| WO | 2009141295 A1 | 11/2009 | |
| WO | 2014090373 A1 | 6/2014 | |
| WO | 2015090506 A1 | 6/2015 | |
| WO | 2015154848 A1 | 10/2015 | |

OTHER PUBLICATIONS

International Search Report PCT/EP2017/061656 dated Jul. 26, 2017.
B. Jelle et al: Solar Energy Materials and Solar Cells; 96 (2012), pp. 1-28.

* cited by examiner

*Primary Examiner* — Geraldina Visconti
(74) *Attorney, Agent, or Firm* — Millen White Zelano & Branigan

(57) ABSTRACT

The present application relates to a liquid-crystalline material comprising a sterically hindered N-oxide and a dye. The invention furthermore relates to the use of the liquid-crystalline material in an optical switching device for regulation of the passage of sunlight.

17 Claims, No Drawings

LIQUID-CRYSTAL MATERIAL

The present application relates to a liquid-crystalline material which comprises a dye and a compound containing an N-oxide group. Owing to its high light and heat stability, the liquid-crystalline material is eminently suitable for use in optical switching devices for regulation of the passage of sunlight. These can be employed, inter alia, in windows of buildings or in light-transmitting roofs, in particular in motor vehicles.

Switching devices of this type are known under the generic term switchable windows (smart windows). These are described in the review, for example, in B. Jelle et al., Solar Energy Materials & Solar Cells 2012, pp. 1-28. The term switchable window here also encompasses switchable light-transmitting roofs, such as, for example skylights or automobile roofs.

A variant of these switchable windows uses liquid-crystalline materials which comprise dyes. These dyes are aligned in space in a defined, influencable manner by the molecules of the liquid-crystalline material, so that they absorb more incident light in one switching state and less in another switching state. Examples of switchable windows containing liquid-crystalline materials are described, inter alia, in WO 2009/141295.

There continues to be a need for novel liquid-crystalline materials for the above-mentioned applications. It has been found here that the optical switching devices for regulation of the passage of sunlight are subjected to high loading by heat and sunlight, which may result in a colour change or other functional disturbance of the layer comprising liquid-crystalline material which is present in the switching device.

There is therefore considerable interest in novel liquid-crystalline materials which have particularly high stability to high temperatures and strong incidence of sunlight.

One possible approach to achieving these properties is the use of dyes having the highest possible stability. This approach has been followed many times in the past, but has the disadvantage that the dyes must have a number of further properties, such as good solubility, high degree of anisotropy and an appropriate absorption wavelength. However, optimisation of these properties together with high light and temperature stability greatly restricts the circle of usable compounds.

There is therefore a considerable need for alternative approaches by means of which light- and temperature-stable dye-containing liquid-crystalline materials can be obtained.

Surprisingly, it is been found in this connection that the addition of a compound containing a sterically hindered N-oxide group to dye-containing liquid-crystalline materials greatly increases their light and temperature stability.

The invention thus relates to a liquid-crystalline material, characterised in that it comprises a dye and a compound (I) containing a sterically hindered group of the formula (1)

formula (1), where the bonds marked by * are the bonds by means of which the group of the formula (1) is connected to the remainder of the compound.

The group of the formula (1) is a free radical, where the unpaired electron on the oxygen atom is denoted by a dot.

The liquid-crystalline material according to the invention has the surprising property of being highly light-stable. In particular, it exhibits a colour difference $\Delta E^*$ in the Lab colour space of less than 6.0, preferably less than 5.0, particularly preferably less than 4.0, very particularly preferably less than 3.0, after exposure to light in a Suntest CPS+ at a surface temperature of the samples of 70° C.

The parameters of the Lab colour space and the colour difference $\Delta E^*$ are defined here as indicated in the working examples.

Furthermore, the material according to the invention exhibits good heat stability, in particular a small colour difference $\Delta E^*$ in the Lab colour space of less than 6.0, preferably less than 5.0, after exposure to heat at 100° C. for 7 days.

For the purposes of the present application, the following definitions apply:

The term "liquid-crystalline material" is taken to mean a material which has liquid-crystalline properties, in particular nematic liquid-crystalline properties, in at least one temperature range.

An alkyl group, an alkenyl group or an alkynyl group is taken to mean, in particular, the radicals methyl, ethyl, n-propyl, i-propyl, n-butyl, i-butyl, s-butyl, t-butyl, 2-methylbutyl, n-pentyl, s-pentyl, cyclopentyl, neopentyl, n-hexyl, cyclohexyl, neohexyl, n-heptyl, cycloheptyl, n-octyl, cyclooctyl, 2-ethylhexyl, trifluoromethyl, pentafluoroethyl, 2,2,2-trifluoroethyl, ethenyl, propenyl, butenyl, pentenyl, cyclopentenyl, hexenyl, cyclohexenyl, heptenyl, cycloheptenyl, octenyl, cyclooctenyl, ethynyl, propynyl, butynyl, pentynyl, hexynyl or octynyl.

An alkoxy or thioalkyl group is taken to mean, in particular, methoxy, trifluoromethoxy, ethoxy, n-propoxy, i-propoxy, n-butoxy, i-butoxy, s-butoxy, t-butoxy, n-pentoxy, s-pentoxy, 2-methylbutoxy, n-hexoxy, cyclohexyloxy, n-heptoxy, cycloheptyloxy, n-octyloxy, cyclooctyloxy, 2-ethylhexyloxy, pentafluoroethoxy, 2,2,2-trifluoroethoxy, methylthio, ethylthio, n-propylthio, i-propylthio, n-butylthio, i-butylthio, s-butylthio, t-butylthio, n-pentylthio, s-pentylthio, n-hexylthio, cyclohexylthio, n-heptylthio, cycloheptylthio, n-octylthio, cyclooctylthio, 2-ethylhexylthio, trifluoromethylthio, pentafluoroethylthio, 2,2,2-trifluoroethylthio, ethenylthio, propenylthio, butenylthio, pentenylthio, cyclopentenylthio, hexenylthio, cyclohexenylthio, heptenylthio, cycloheptenylthio, octenylthio, cyclooctenylthio, ethynylthio, propynylthio, butynylthio, pentynylthio, hexynylthio, heptynylthio or octynylthio.

An aryl group or heteroaryl group is taken to mean, in particular, benzene, naphthalene, anthracene, phenanthrene, pyrene, dihydropyrene, chrysene, perylene, triphenylene, fluoranthene, benzanthracene, benzophenanthrene, tetracene, pentacene, benzopyrene, furan, benzofuran, isobenzofuran, dibenzofuran, thiophene, benzothiophene, isobenzothiophene, dibenzothiophene, pyrrole, indole, isoindole, carbazole, pyridine, quinoline, isoquinoline, acridine, phenanthridine, benzo-5,6-quinoline, benzo-6,7-quinoline, benzo-7,8-quinoline, phenothiazine, phenoxazine, pyrazole, indazole, imidazole, benzimidazole, naphthimidazole, phenanthrimidazole, pyridimidazole, pyrazinimidazole, quinoxalinimidazole, oxazole, benzoxazole, naphthoxazole, anthroxazole, phenanthroxazole, isoxazole, 1,2-thiazole, 1,3-thiazole, benzothiazole, pyridazine, benzopyridazine, pyrimidine, benzopyrimidine, quinoxaline, pyrazine, phenazine, naphthyridine, azacarbazole, benzocarboline, phenanthroline, 1,2,3-triazole, 1,2,4-triazole, benzotriazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 1,3,5-triazine, 1,2,4-triazine, 1,2,3-triazine, tetrazole, 1,2,4,5-tetrazine, 1,2,3,4-tetrazine, 1,2,3,5-tetrazine, purine, pteridine, indolizine, benzothiadiazole, biphenyl, terphenyl, quaterphenyl, fluorene, spirobifluorene, dihydrophenanthrene, dihydropyrene, tetrahydropyrene, indenofluorene, truxene, isotruxene, spirotruxene, spiroisotruxene and indenocarbazole.

In order to improve the legibility, rings

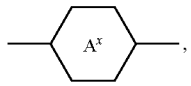

for example

are abbreviated to "$A^x$", for example "$A^{11}$", in the running text in the present application.

The term

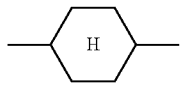

in the present application is taken to mean 1,4-cyclohexylene.

Sunlight is taken to mean light which emanates directly or indirectly, for example via mirroring, from the sun. Sunlight is preferably taken to mean light in the VIS, UV-A and NIR region, in particular light having a wavelength of 320 nm to 2000 nm. This is preferably taken to mean light in the VIS region. Light in the VIS region here is taken to mean light having a wavelength of 380 nm to 780 nm.

For the purposes of the present invention, the term sterically hindered in relation to the group of the formula (1) is taken to mean that groups which spatially screen the N—O unit are present in the vicinity of the N—O unit. These are preferably quaternary C atoms which are bonded directly to the nitrogen atom of the N—O unit. A quaternary carbon atom is particularly preferably bonded to both bonds of the nitrogen atom of the N—O unit. The quaternary carbon atom here is preferably a carbon atom which carries three alkyl groups, each having 1 to 12 C atoms.

The compound (I) preferably contains a group of the formula (1-1) or (1-2)

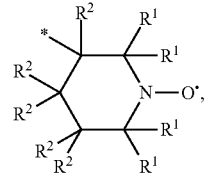

formula (1-1)

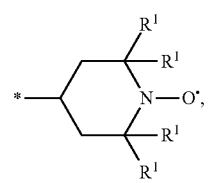

formula (1-2)

where the bond marked by * is the bond by means of which the group is connected to the remainder of the compound, and where $R^1$ is selected on each occurrence, identically or differently, from $Si(R^3)_3$ and alkyl groups having 1 to 12 C atoms, which may be substituted by one or more radicals selected from F, Cl and CN; and where $R^2$ is selected on each occurrence, identically or differently, from H, F, $C(=O)R^3$, CN, $Si(R^3)_3$, $N(R^3)_2$, $P(=O)(R^3)_2$, $OR^3$, $S(=O)R^3$, $S(=O)_2R^3$, straight-chain alkyl or alkoxy groups having 1 to 20 C atoms, branched or cyclic alkyl or alkoxy groups having 3 to 20 C atoms, alkenyl or alkynyl groups having 2 to 20 C atoms, aryl groups having 6 to 40 aromatic ring atoms and heteroaryl groups having 5 to 40 aromatic ring atoms; where the said alkyl, alkoxy, alkenyl and alkynyl groups and the said aryl groups and heteroaryl groups may in each case be substituted by one or more radicals $R^3$; and where one or more $CH_2$ groups in the said alkyl, alkoxy, alkenyl and alkynyl groups may be replaced by $—R^3C=CR^3—$, $—C≡C—$, $Si(R^3)_2$, $C=O$, $C=NR^3$, $—C(=O)O—$, $—C(=O)NR^3—$, $NR^3$, $P(=O)(R^3)$, $—O—$, $—S—$, SO or $SO_2$; and where $R^3$ is selected on each occurrence, identically or differently, from H, D, F, CN, alkyl or alkoxy groups having 1 to 20 C atoms, alkenyl or alkynyl groups having 2 to 20 C atoms, aryl groups having 6 to 40 aromatic ring atoms and heteroaryl groups having 5 to 40 aromatic ring atoms; where two or more radicals $R^3$ may be linked to one another and may form a ring; and where the said alkyl, alkoxy, alkenyl and alkynyl groups, aryl groups and heteroaryl groups may be substituted by F or CN.

$R^1$ is preferably selected from alkyl groups having 1 to 8 C atoms. $R^1$ is particularly preferably equal to methyl.

$R^2$ is preferably equal to H.

$R^3$ in $Si(R^3)_2$ groups is preferably selected from alkyl groups having 1 to 20 C atoms and aryl groups having 6 to 40 aromatic ring atoms.

The compound (I) preferably contains a group of the formula (1-1).

The compound (I) particularly preferably contains precisely one, precisely two, precisely three or precisely four groups of the formula (1). It very particularly preferably contains precisely two groups of the formula (1). In the case where the compound (I) contains a multiplicity of groups of the formula (1), it is preferred that these groups are separated from one another by one or more spacer groups.

The compound (I) particularly preferably contains a group of the formula (1-1-1)

formula (1-1-1)

where the bond marked by * is the bond by means of which the group is connected to the remainder of the compound, and where $R^1$ is as defined above and is preferably equal to methyl.

The compound (I) preferably conforms to a formula (I)

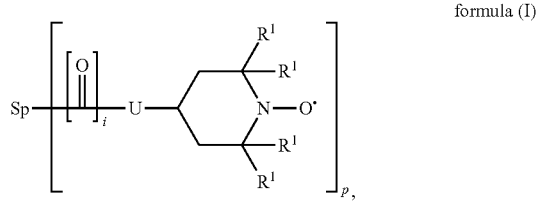

formula (I)

where the following applies to the variables occurring:

U is selected on each occurrence, identically or differently, from —$CH_2$—, —O—, —S— and —NH—;

Sp is selected from alkylene groups having 2 to 10 C atoms, which may in each case be substituted by one or more radicals $R^4$, alkenylene groups having 2 to 10 C atoms, which may in each case be substituted by one or more radicals $R^4$, alkynylene groups having 2 to 10 C atoms, which may in each case be substituted by one or more radicals $R^4$, aryl groups having 6 to 40 aromatic ring atoms, which may in each case be substituted by one or more radicals $R^4$, and heteroaryl groups having 5 to 40 aromatic ring atoms, which may in each case be substituted by one or more radicals $R^4$;

$R^1$ is defined as above;

$R^4$ is selected on each occurrence, identically or differently, from H, D, F, CN, alkyl or alkoxy groups having 1 to 20 C atoms, alkenyl or alkynyl groups having 2 to 20 C atoms, aryl groups having 6 to 40 aromatic ring atoms and heteroaryl groups having 5 to 40 aromatic ring atoms; where two or more radicals $R^3$ may be linked to one another and may form a ring; and where the said alkyl, alkoxy, alkenyl and alkynyl groups, aryl groups and heteroaryl groups may be substituted by F or CN;

i is on each occurrence, identically or differently, 0 or 1;

p is equal to 2, 3 or 4.

$R^1$ in formula (I) is preferably equal to methyl. Furthermore, i is preferably equal to 1. Furthermore, p is preferably equal to 2. Again furthermore, U is preferably equal to —O—. Again furthermore, Sp is preferably selected from alkylene groups having 2 to 10 C atoms.

The compound (I) particularly preferably conforms to a formula (I-1)

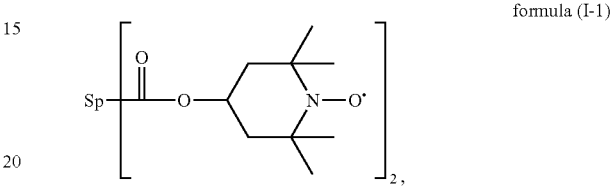

formula (I-1)

where the following applies to the variables occurring:

Sp is selected from alkylene groups having 2 to 10 C atoms, which may in each case be substituted by one or more radicals $R^4$, alkenylene groups having 2 to 10 C atoms, which may in each case be substituted by one or more radicals $R^4$, alkynylene groups having 2 to 10 C atoms, which may in each case be substituted by one or more radicals $R^4$, aryl groups having 6 to 40 aromatic ring atoms, which may in each case be substituted by one or more radicals $R^4$, and heteroaryl groups having 5 to 40 aromatic ring atoms, which may in each case be substituted by one or more radicals $R^4$;

$R^4$ is defined as above.

$R^4$ in formula (I-1) is particularly preferably selected from alkylene groups having 2 to 10 C atoms.

Preferred specific compounds (I) are depicted in the following table:

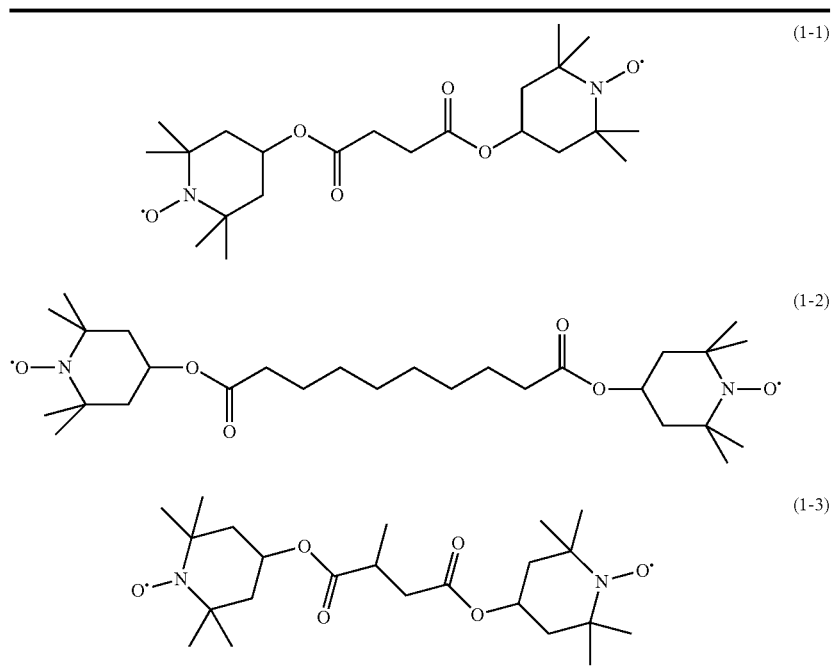

-continued
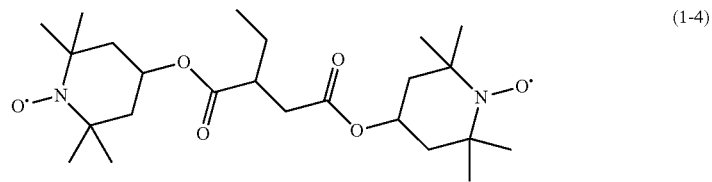
(1-4)
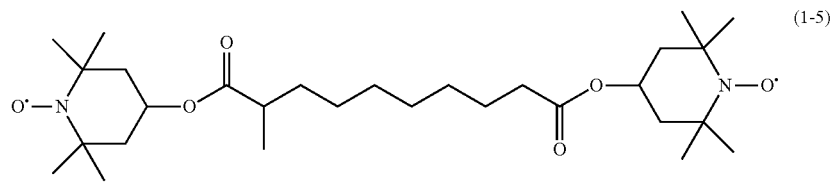
(1-5)
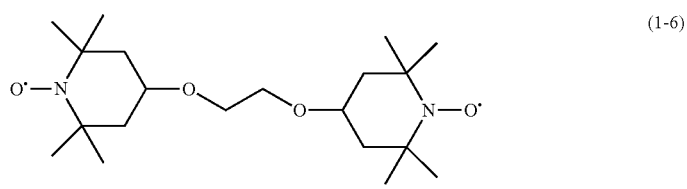
(1-6)
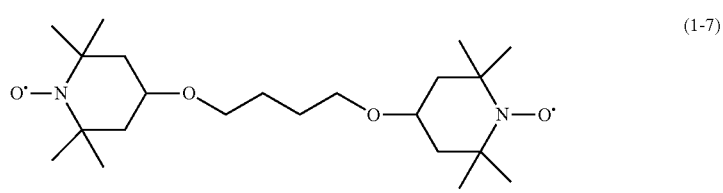
(1-7)
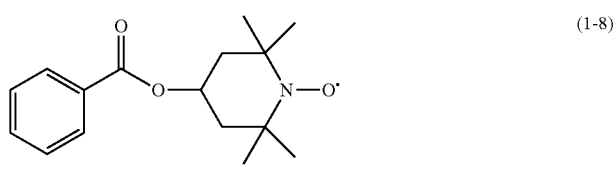
(1-8)
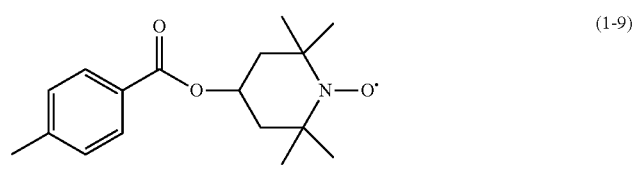
(1-9)
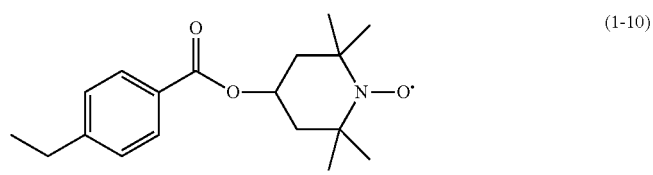
(1-10)
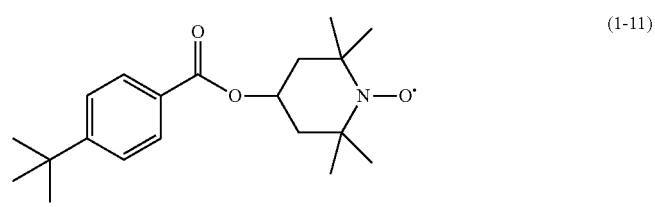
(1-11)

-continued
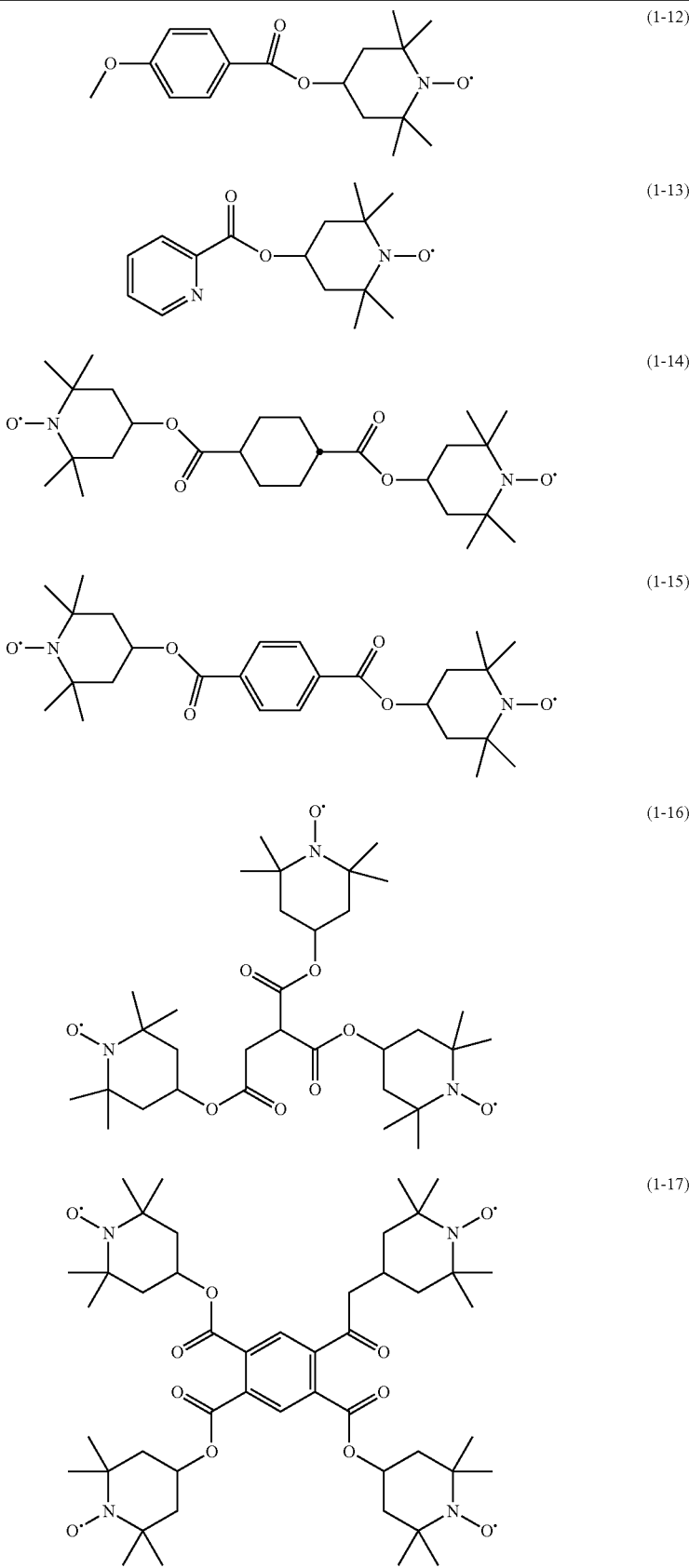

The compound (I) is preferably present in the liquid-crystalline material in a proportion of 0.01% by weight to 1% by weight, particularly preferably in a proportion of 0.02% by weight to 0.8% by weight.

The liquid-crystalline material is preferably nematically liquid-crystalline at usual ambient temperatures. It is particularly preferably nematically liquid-crystalline in a range of +−20° C., very particularly preferably in a range of +−30° C. above and below the usual ambient temperatures. Furthermore, the liquid-crystalline material preferably has a clearing point, preferably a phase transition from a nematic liquid-crystalline state to an isotropic state, above 80° C., particularly preferably above 100° C., very particularly preferably above 120° C., and most preferably above 130° C.

The liquid-crystalline material is preferably composed of organic compounds which have a rod-shaped structure in a proportion of greater than 90% by weight. The liquid-crystalline material preferably comprises more than 3 and less than 20 different organic compounds of those mentioned.

Compounds which can be used as constituents of the liquid-crystalline material are known to the person skilled in the art and can in principle be selected as desired. The liquid-crystalline material preferably comprises at least one compound which contains structural elements based on 1,4-phenylenes and 1,4-cyclohexylenes. The liquid-crystalline material particularly preferably comprises at least one compound which contains 2, 3 or 4, particularly preferably 3 or 4 structural elements based on 1,4-phenylenes and 1,4-cyclohexylenes.

The liquid-crystalline material preferably comprises one or more mesogenic compounds, which in each case contain a group selected from -Cyc-, -Phe-, -Cyc-Cyc-, -Cyc-Phe-, -Phe-Cyc-, -Phe-Phe-, -Cyc-Z-Cyc-, -Cyc-Z-Phe-, -Phe-Z-Cyc- and -Phe-Z-Phe-, where Cyc denotes trans-1,4-cyclohexylene, in which, in addition, one or more non-adjacent $CH_2$ groups may be replaced by —O— and/or —S— and in which, in addition, one or more H atoms may be replaced by F Phe denotes 1,3-phenylene or 1,4-phenylene, preferably 1,4-phenylene, in which, in addition, one or two non-adjacent CH groups may be replaced by N and in which, in addition, one or more H atoms may be replaced by L, Z denotes —$CH_2$—, —$CF_2$—, —CO—, —O—, —NH—, —NH—(CO)—, —$CH_2CH_2$—, —CH═CH—, —$CF_2O$—, —$OCF_2$—, —$CH_2O$—, —$OCH_2$—, —COO—, —OCO—, —$C_2F_4$— or —CF═CF—, and L on each occurrence, identically or differently, denotes F, Cl, CN or straight-chain or branched, in each case optionally fluorinated alkyl, alkoxy, arylalkyl or alkylarylalkyl having 1 to 5 C atoms, in which, in addition, one or more non-adjacent $CH_2$ groups may be replaced by —O— and/or —S—.

Furthermore, the liquid-crystalline material preferably comprises at least one compound which contains at least one group selected from the following:

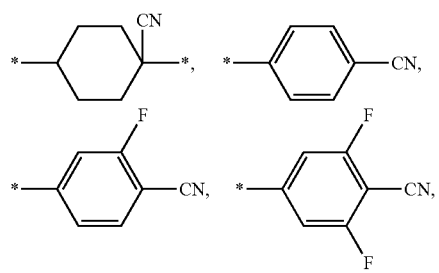

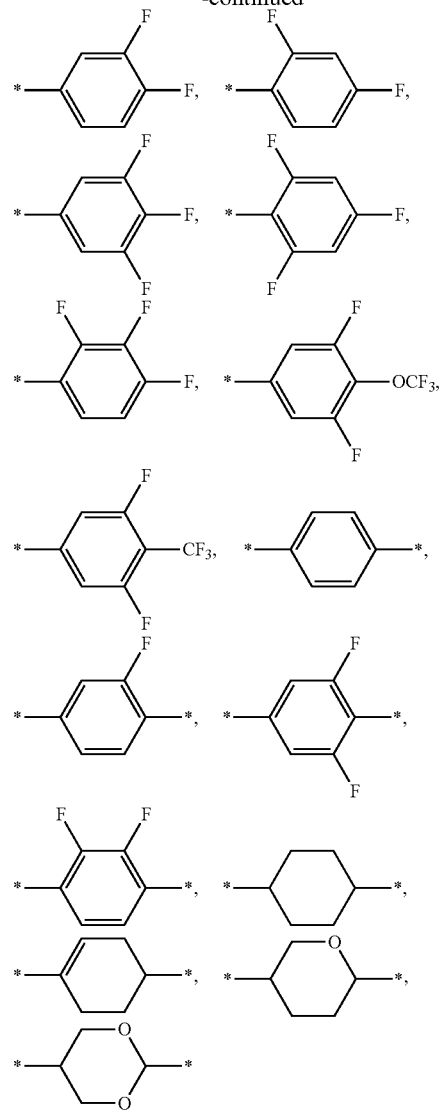

where the bond marked by * is the bond by means of which the group is connected to the remainder of the compound.

The liquid-crystalline material particularly preferably comprises at least one compound which contains at least one group selected from the following:

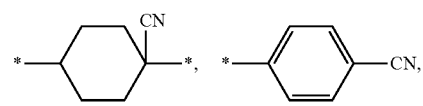

where the bond marked by * is the bond by means of which the group is connected to the remainder of the compound.

The liquid-crystalline material preferably additionally comprises a compound (II) which contains a sterically hindered hydroxyphenyl group. This has the technical effect that liquid-crystalline materials can be obtained which are particularly light-stable and temperature-stable.

The term sterically hindered hydroxyphenyl group in the sense of the present invention is taken to mean that chemical groups which screen the hydroxyphenyl group are present in the vicinity of the hydroxyl group of the latter. These chemical groups are preferably bonded at one or both of the positions on the benzene ring which are ortho to the hydroxyl group. These chemical groups are particularly preferably bonded at both positions on the benzene ring which are ortho to the hydroxyl group. These chemical groups are preferably selected from alkyl groups having 1 to 10 C atoms and silyl groups which carry radicals selected from alkyl groups having 1 to 12 C atoms and aryl groups having 6 to 40 aromatic ring atoms, particularly preferably from branched alkyl groups having 3 to 10 C atoms, very particularly preferably from tert-butyl groups or neopentyl groups.

The compound (II) preferably contains a group of the formula (2)

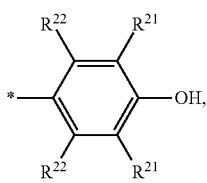

formula (2)

where the bond marked by * is the bond by means of which the group is connected to the remainder of the compound, and where $R^{21}$ is selected on each occurrence, identically or differently, from H; silyl groups which carry radicals selected from alkyl groups having 1 to 12 C atoms and aryl groups having 6 to 40 aromatic ring atoms; and alkyl groups having 1 to 12 C atoms, which may be substituted by one or more radicals selected from F, Cl and CN, where at least one $R^{21}$ is selected from silyl groups which carry radicals selected from alkyl groups having 1 to 12 C atoms and aryl groups having 6 to 40 aromatic ring atoms; and alkyl groups having 1 to 12 C atoms, which may be substituted by one or more radicals selected from F, Cl and CN; and where $R^{22}$ is selected on each occurrence, identically or differently, from H and alkyl groups having 1 to 12 C atoms, which may be substituted by one or more radicals selected from F, Cl and CN.

$R^{21}$ is preferably selected on each occurrence, identically or differently, from sterically bulky alkyl groups, particularly preferably from branched alkyl groups having 3 to 12 C atoms, which may be substituted by one or more radicals selected from F, Cl and CN. $R^{21}$ is very particularly preferably selected on each occurrence, identically or differently, from tert-butyl and neopentyl, $R^{21}$ is most preferably tert-butyl.

$R^{22}$ is preferably equal to H.

The compound (II) preferably contains precisely one, precisely two or precisely three groups of the formula (2), particularly preferably precisely one group of the formula (2).

The compound (II) preferably conforms to a formula (II)

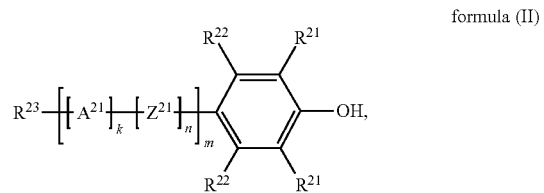

formula (II)

where the following applies to the variables occurring:
$R^{21}$ and $R^{22}$ are defined as above;
$R^{23}$ is selected from H, F, Cl, CN, NCS, alkyl groups having 1 to 20 C atoms, alkoxy groups having 1 to 20 C atoms, thioalkyl groups having 1 to 10 C atoms, alkenyl groups having 2 to 20 C atoms, and alkenyloxy groups having 2 to 20 C atoms, where one or more H atoms in the alkyl, alkoxy, thioalkyl, alkenyl and alkenyloxy groups may be replaced by F, Cl or CN;
$A^{21}$ is selected on each occurrence, identically or differently, from

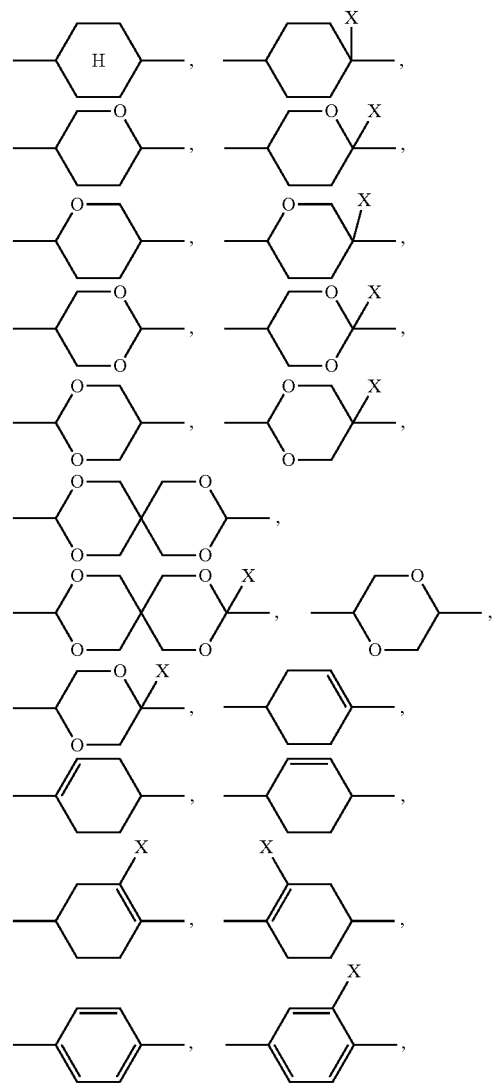

-continued

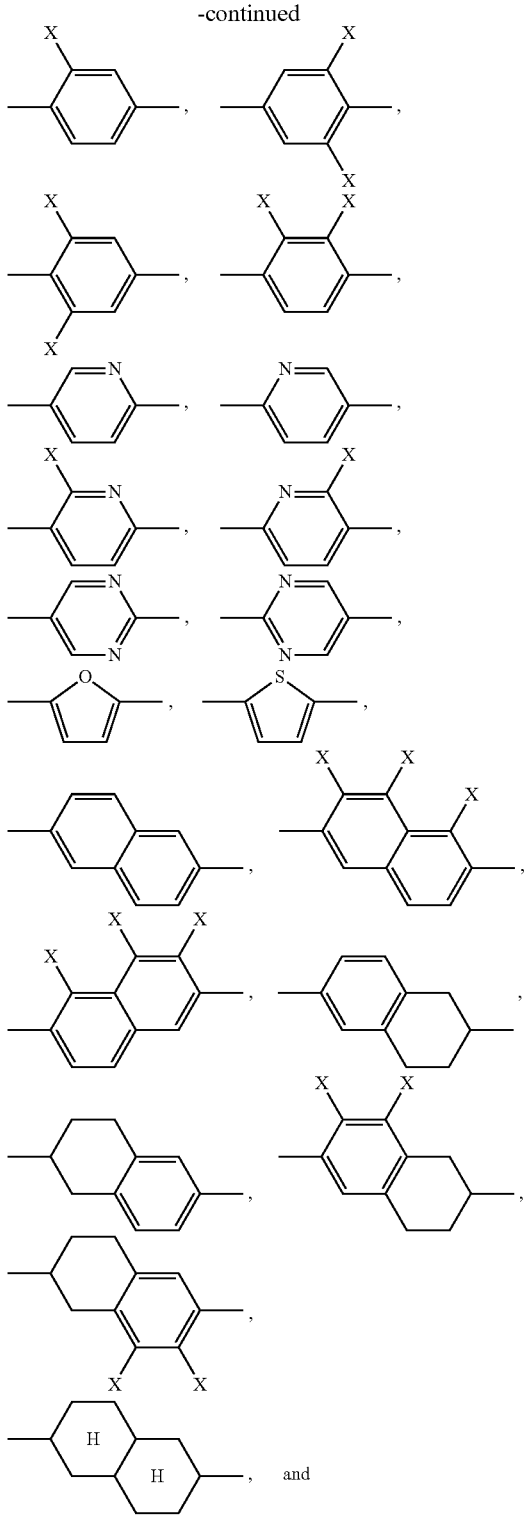

X is selected on each occurrence, identically or differently, from F, Cl, CN, N$_3$, —NCS, NO$_2$, —C≡C—R$^x$, alkyl groups having 1 to 12 C atoms, alkoxy groups having 1 to 10 C atoms and thioalkyl groups having 1 to 12 C atoms, where one or more hydrogen atoms in the alkyl, alkoxy and thioalkyl groups may be replaced by F, Cl or CN, and where one or more CH$_2$ groups in the alkyl, alkoxy and thioalkyl groups may be replaced by O or S;

R$^x$ is selected on each occurrence, identically or differently, from H, CN, and alkyl groups having 1 to 10 C atoms, where one or more C atoms in the alkyl groups may be replaced by F, Cl or CN;

Z$^{21}$ is selected on each occurrence, identically or differently, from alkylene groups having 1 to 12 C atoms, alkenylene groups having 2 to 12 C atoms, alkynylene groups having 2 to 12 C atoms, —O—, —S—, —NH—, —(C═O)—O—, —O—(C═O)—, —CF$_2$—O—, —O—CF$_2$—, —O—CH$_2$— and —CH$_2$—O—;

k is on each occurrence, identically or differently, 0, 1 or 2;

m is equal to 0, 1, 2 or 3;

n is on each occurrence, identically or differently, 0, 1 or 2.

In formula (II), R$^{23}$ is preferably selected from alkyl or alkoxy groups having 1 to 20 C atoms, particularly preferably from alkyl groups having 1 to 12 C atoms. Furthermore, the preferred embodiments applied to the groups R$^{21}$ and R$^{22}$.

Furthermore, A$^{21}$ is preferably selected on each occurrence, identically or differently, from

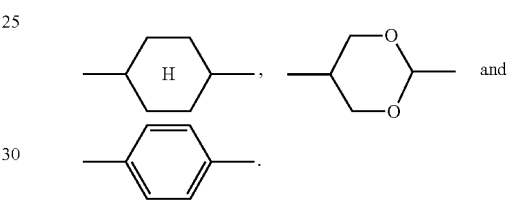

Again furthermore, k, m and n are selected on each occurrence, identically or differently, from 0 or 1.

Furthermore preferably, k is equal to 1 or 2, and m is equal to 1, 2 or 3. Most preferably, k is equal to 1, m is equal to 1 and n is equal to 0, giving a compound of the preferred formula (IIA):

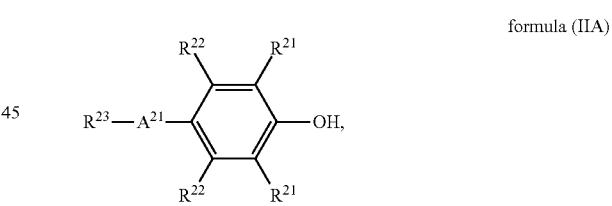

formula (IIA)

where the variables occurring are defined as above. The variables R$^{21}$, R$^{22}$, R$^{23}$ and A$^{21}$ preferably correspond to the preferred embodiments indicated above.

Particularly preferred embodiments of the compounds (II) conform to the following formulae:

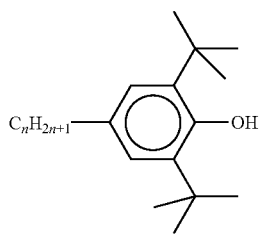

where n=1, 2, 3, 4, 5, 6 or 7, preferably is equal to 1, 4 or 7;
formula (II-1)
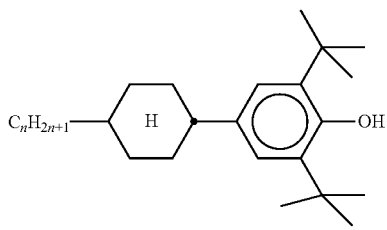
where n=1, 2, 3, 4, 5, 6 or 7 ist, preferably is equal to 3;
formula (II-2)
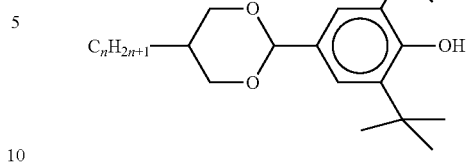
where n=1, 2, 3, 4, 5, 6 or 7 ist, preferably is equal to 3;
formula (II-3).
Preferred specific compounds (II) are depicted in the following table:
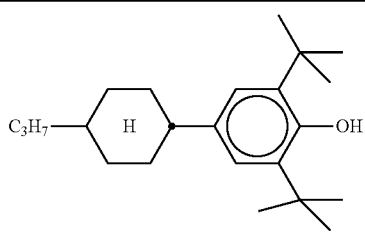
(2-1)
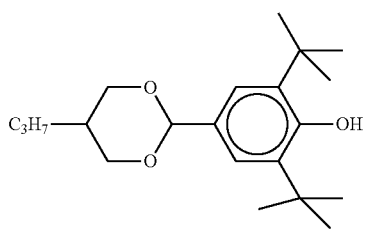
(2-2)
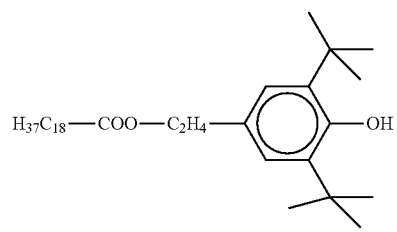
(2-3)
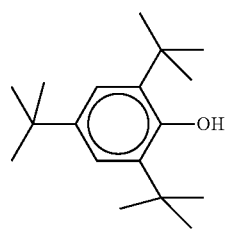
(2-4)
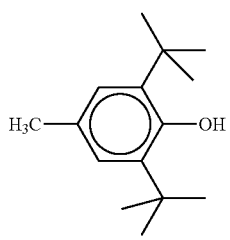
(2-5)

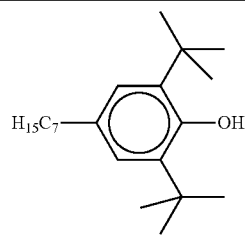
(2-6)
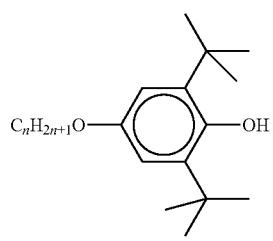
(2-7)
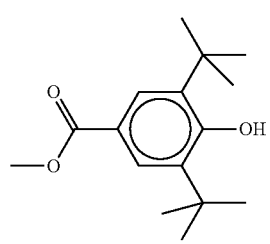
(2-8)
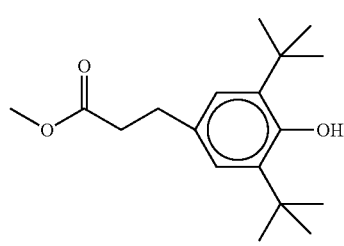
(2-9)
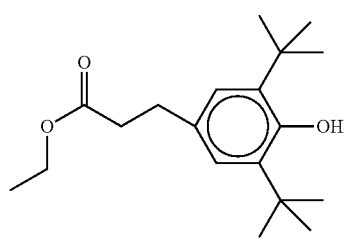
(2-10)
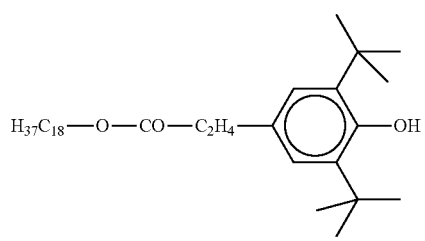
(2-11)
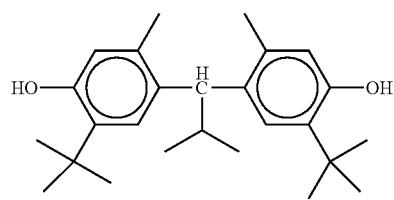
(2-12)

-continued
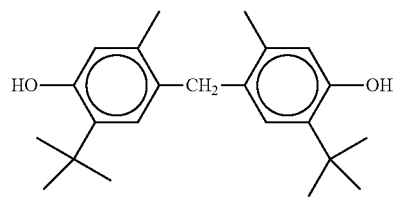
(2-13)
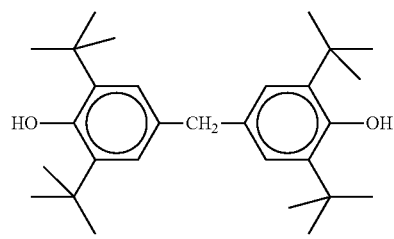
(2-14)
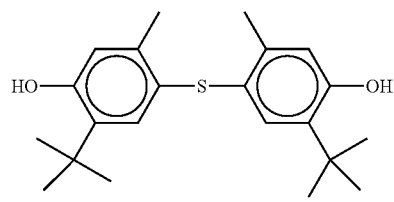
(2-15)
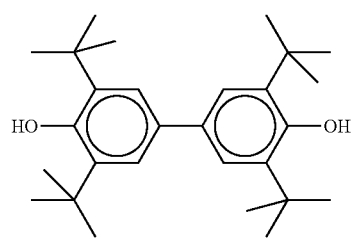
(2-16)
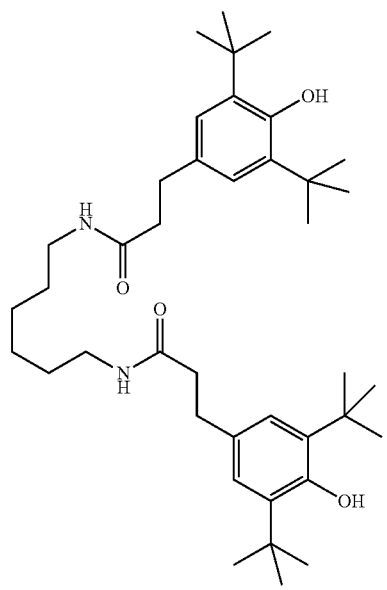 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
(2-17)

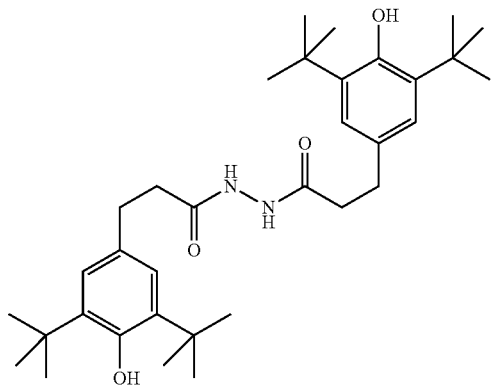 [SMILES: CC(C)(C)c1cc(CCC(=O)NNC(=O)CCc2cc(C(C)(C)C)c(O)c(C(C)(C)C)c2)cc(C(C)(C)C)c1O]
(2-18)
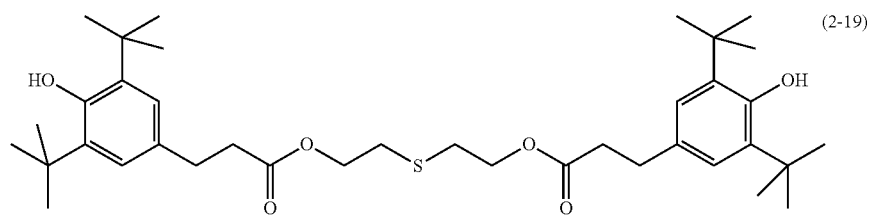
(2-19)
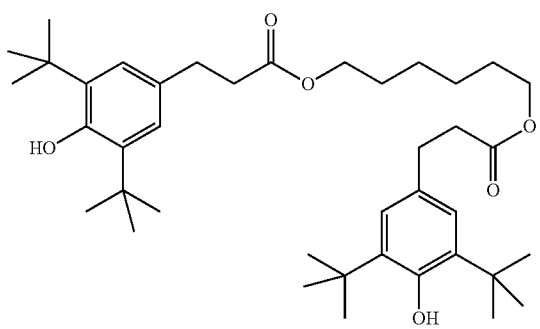 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
(2-20)
(2-21)
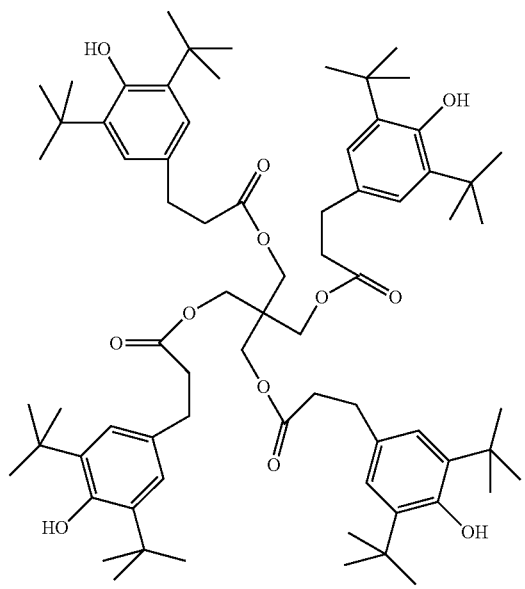 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

(2-22)
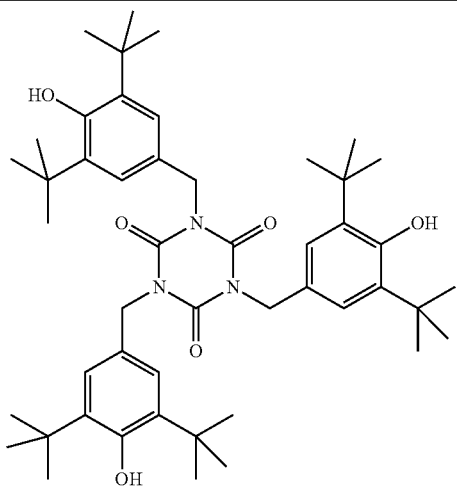
(2-23)
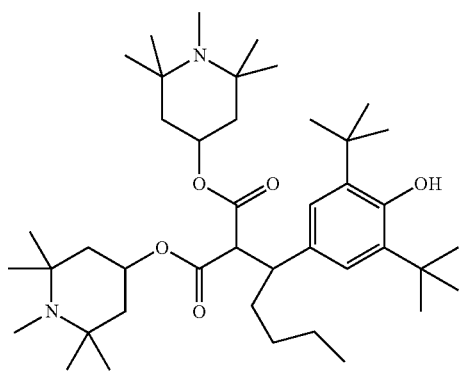 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
The liquid-crystalline material particularly preferably comprises a combination of a compound (I) of the formula (I-1) with a compound (II) of the formula (II). Very particular preference is given to the combination of a compound (I) selected from compounds
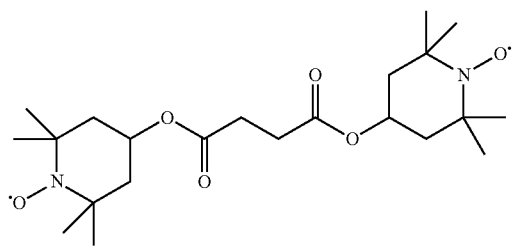
and
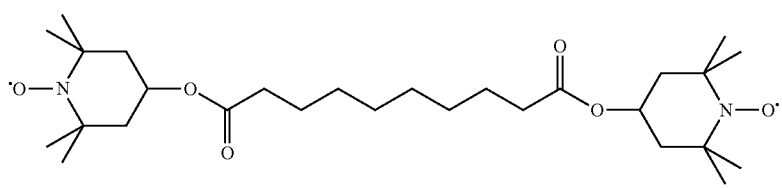
with a compound of the formula (II) selected from compounds

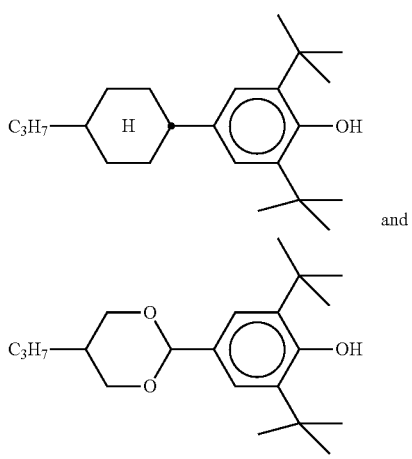

The compound (II) is preferably present in the liquid-crystalline material in a proportion of 0.01% by weight to 1% by weight, particularly preferably in a proportion of 0.02% by weight to 0.8% by weight.

The dye present in the liquid-crystalline material is preferably an organic compound, particularly preferably an organic compound containing at least one condensed aryl or heteroaryl group. A condensed aryl or heteroaryl group here is taken to mean a group which contains at least two single aromatic or heteroaromatic rings, in particular 5- or 6-membered rings, which share at least one edge with one another. Examples of condensed aryl groups and heteroaryl groups are naphthyl, anthracenyl, pyrenyl, perylenyl, carbazolyl, acridinyl and quinolinyl.

The liquid-crystalline material preferably comprises at least two, particularly preferably at least three and very particularly preferably three or four different dyes. The at least two dyes preferably each cover different regions of the light spectrum.

If two or more dyes are present in the liquid-crystalline material, the absorption spectra of these dyes preferably complement one another in such a way that essentially the entire visible spectrum of light is absorbed. The impression of a black colour thus arises for the human eye. This is preferably achieved by using three or more different dyes, at least one of which absorbs blue light, at least one of which absorbs green to yellow light and at least one of which absorbs red light. Light colour here is defined in accordance with B. Bahadur, Liquid Crystals—Applications and Uses, Vol. 3, 1992, World Scientific Publishing, section 11.2.1.

The total proportion of the dyes in the liquid-crystalline material is preferably 0.01 to 20% by weight, particularly preferably 0.1 to 15% by weight and very particularly preferably 0.2 to 12% by weight. The proportion of each individual one of the one or more dyes is preferably 0.01 to 15% by weight preferably 0.05 to 12% by weight and very particularly preferably 0.1 to 10% by weight.

The dye present in the liquid-crystalline material is preferably in dissolved form therein. The dye is preferably influenced in its alignment by the alignment of the molecules of the liquid-crystalline material in the liquid-crystalline state.

The dye is preferably a dichroic dye, particularly preferably a positively dichroic dye. Positively dichroic is taken to mean that the dye has a positive degree of anisotropy R. The degree of anisotropy R is particularly preferably greater than 0.4, very particularly preferably greater than 0.5 and most preferably greater than 0.6. The degree of anisotropy R is determined as indicated in the working examples of the application text WO2015/154848.

In an alternative embodiment, it may also be preferred for the dye to be a negatively dichroic dye. Negatively dichroic is taken to mean that the dye has a negative degree of anisotropy R.

The dyes present in the liquid-crystalline material are preferably either all positively dichroic, or all negatively dichroic.

Furthermore preferably, the dye in accordance with the present application absorbs predominantly light in the UV-VIS-NIR region, i.e. in a wavelength range from 320 to 1500 nm. The dye particularly preferably absorbs predominantly light in the VIS region, i.e. in a wavelength range from 380 to 780 nm. The dye particularly preferably has one or more absorption maxima in the UV-VIS-NIR region defined above, preferably in the VIS region, i.e. a wavelength of 380 nm to 780 nm. For applications in switchable windows, it may likewise be preferred for the dye to have one or more absorption maxima in the NIR region, in particular between 780 nm and 1500 nm.

The dye is furthermore preferably selected from the dye classes indicated in B. Bahadur, Liquid Crystals—Applications and Uses, Vol. 3, 1992, World Scientific Publishing, section 11.2.1, and particularly preferably from the explicit compounds shown in the table.

The dye is preferably selected from azo compounds, anthraquinones, methine compounds, azomethine compounds, merocyanine compounds, naphthoquinones, tetrazines, rylenes, in particular perylenes and terylenes, benzothiadiazoles, pyrromethenes and diketopyrrolopyrroles. Of these, particular preference is given to azo compounds, anthraquinones, benzothiadiazoles, in particular as disclosed in WO 2014/187529, diketopyrrolopyrroles, in particular as disclosed in WO 2015/090497, and rylenes, in particular as disclosed in WO 2015/090373. The dye is most preferably selected from azo dyes, anthraquinones containing amino groups, and anthraquinones without amino groups.

The following compounds are examples of the said dyes:

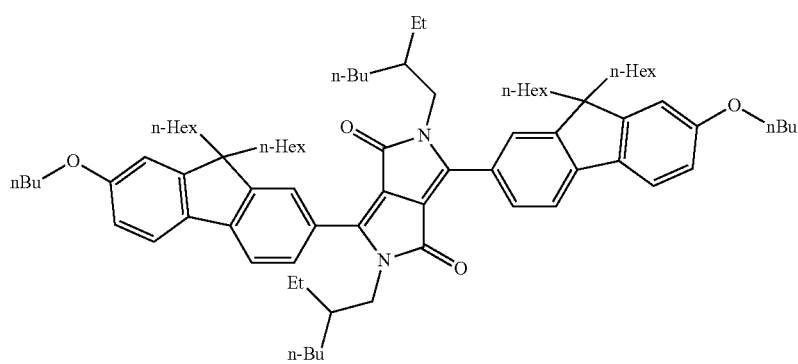

1

-continued
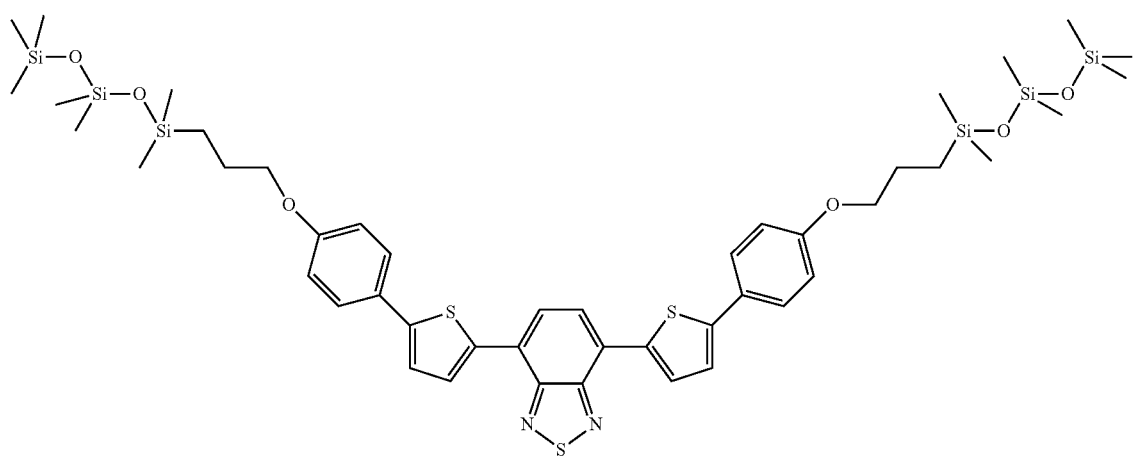
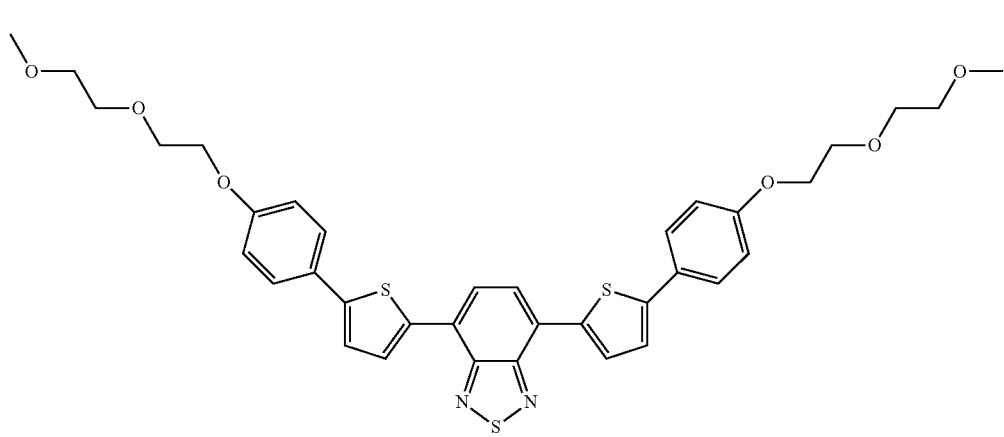
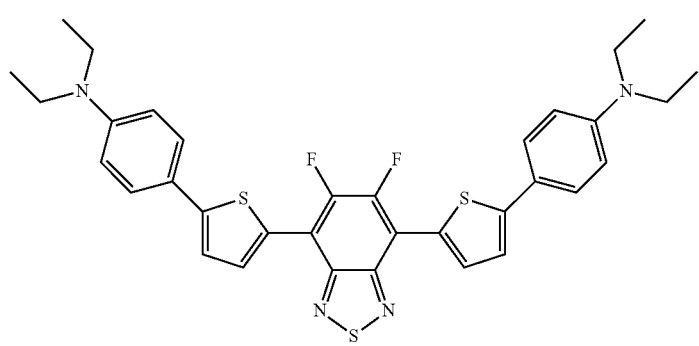
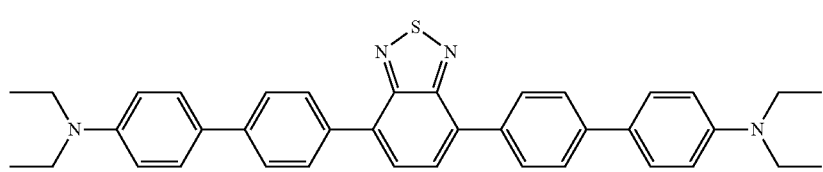

-continued
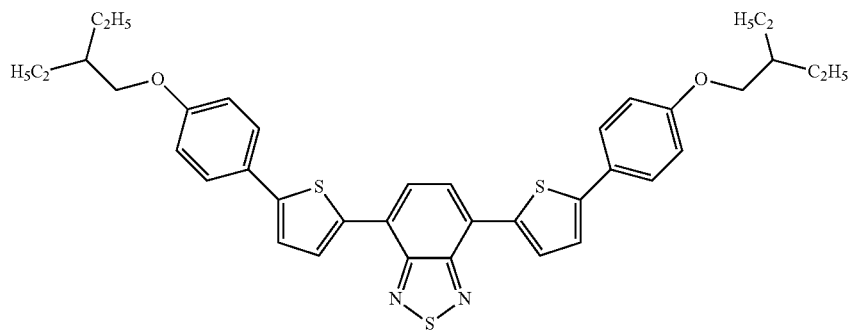
6
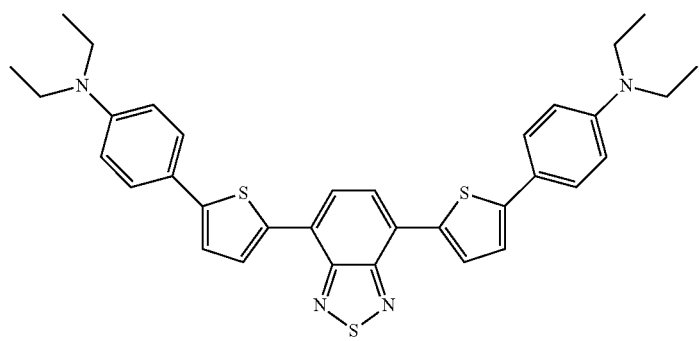
7
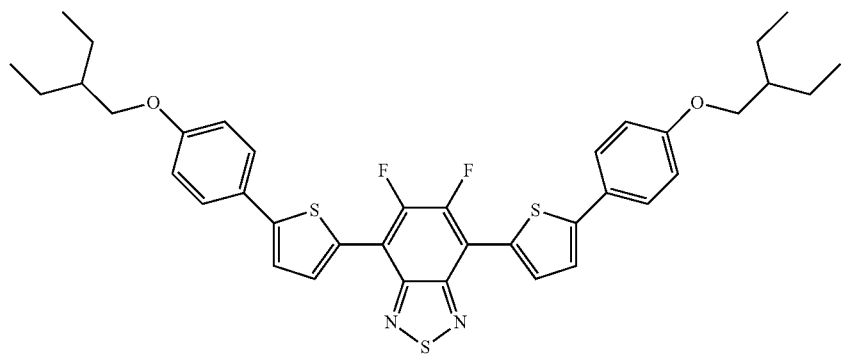
8
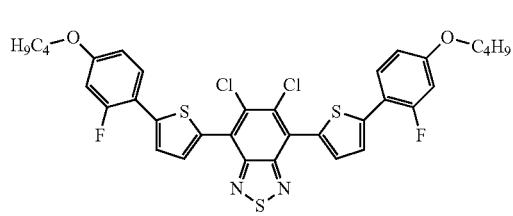
9
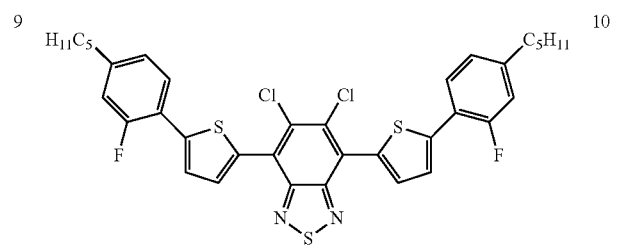
10
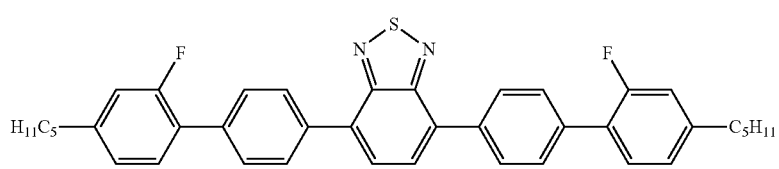
11

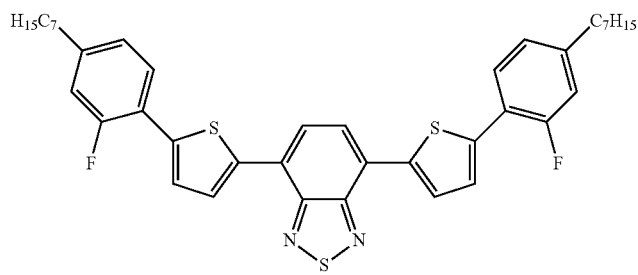
12
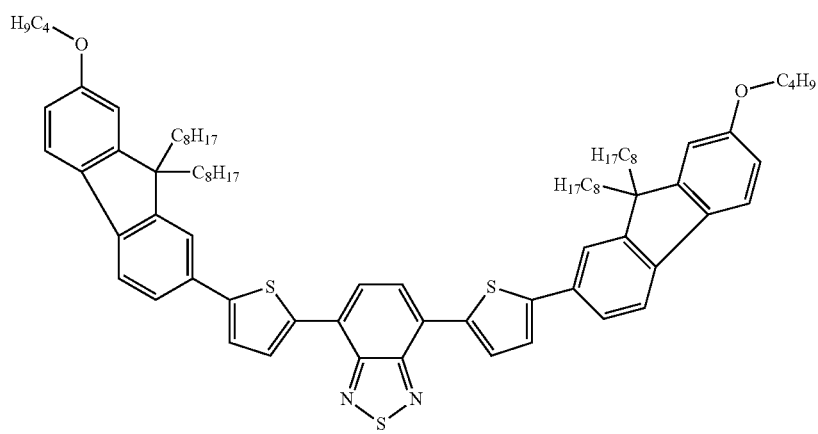
13
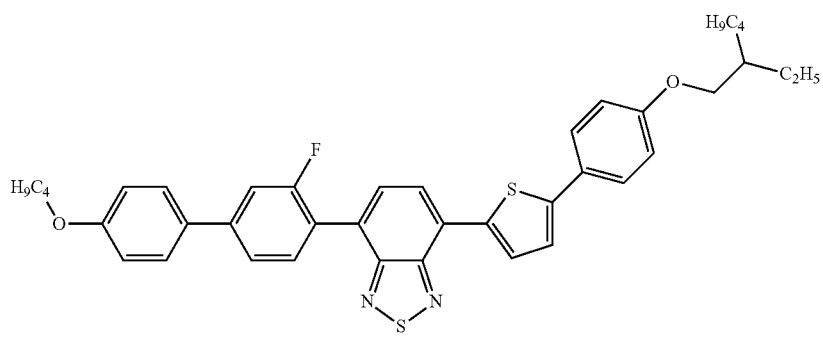
14
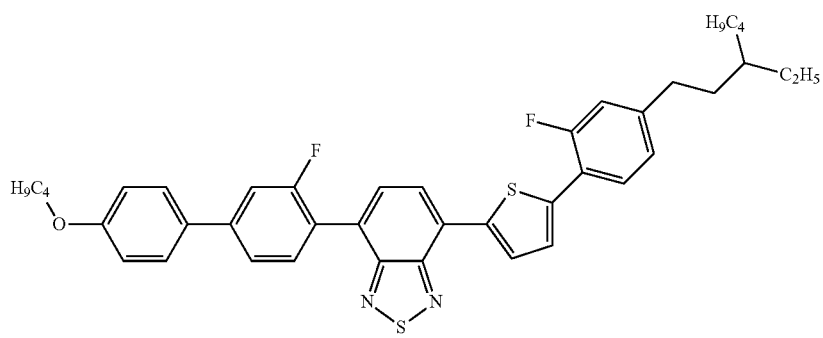
15

-continued
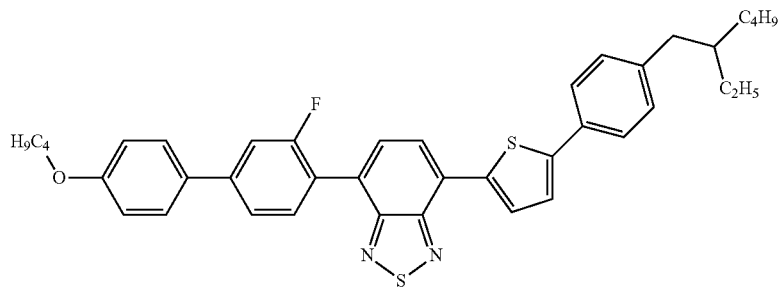
16
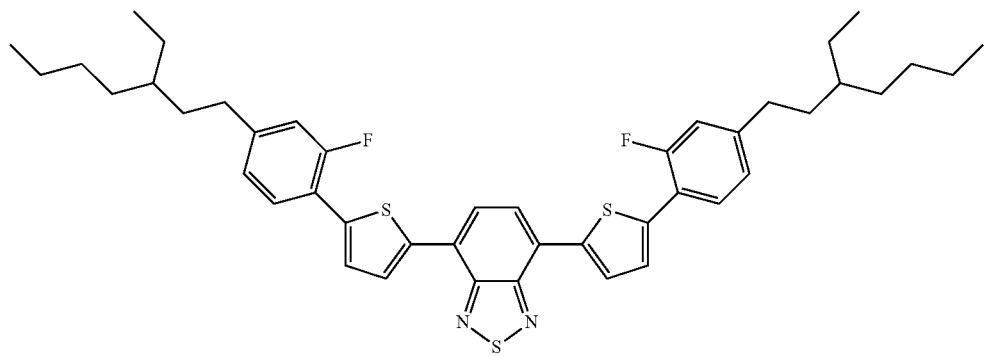
17
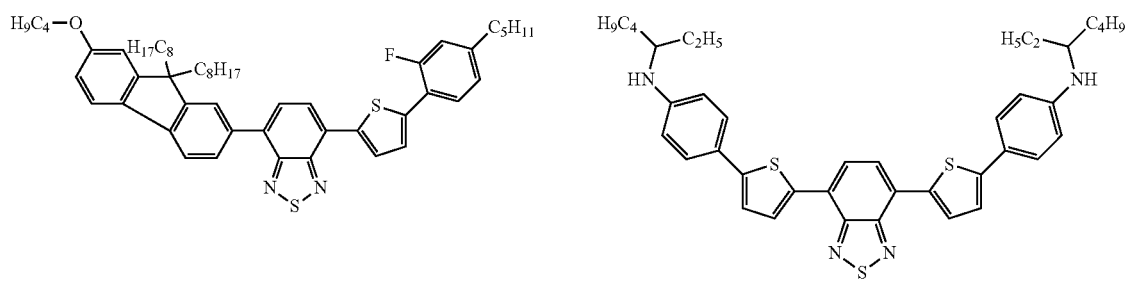
18 19
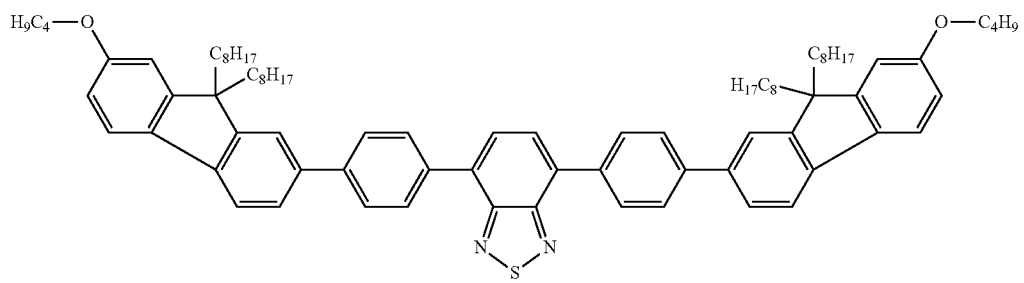
20
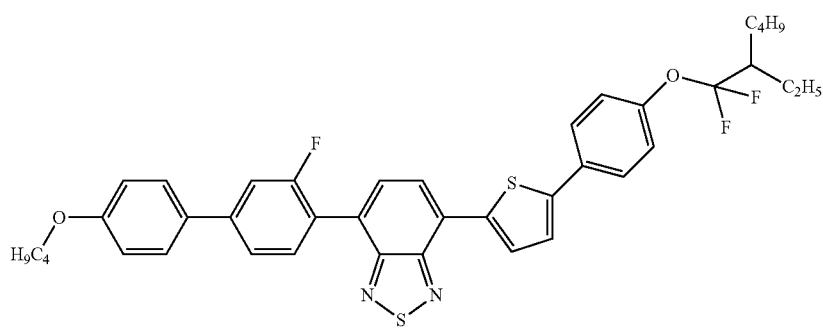
21

-continued
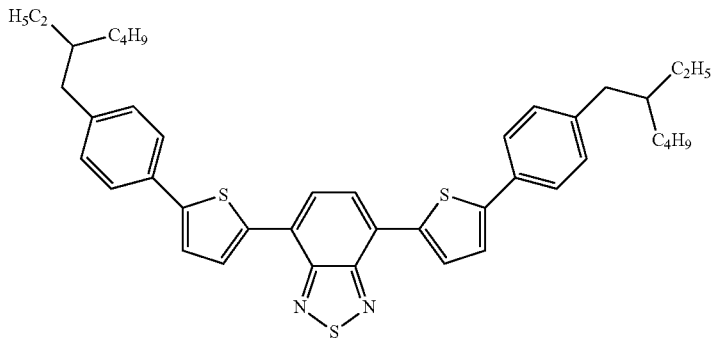
22
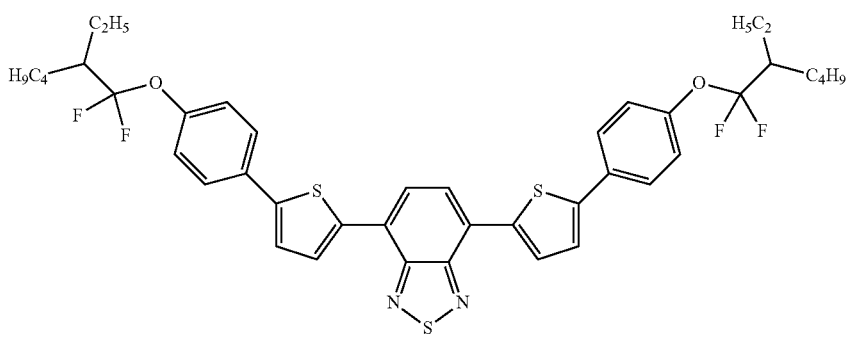
23
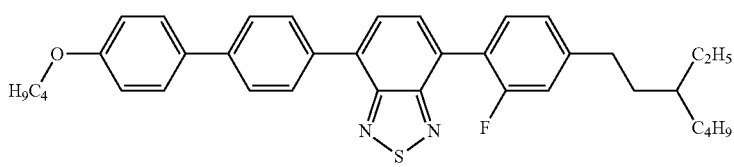
24
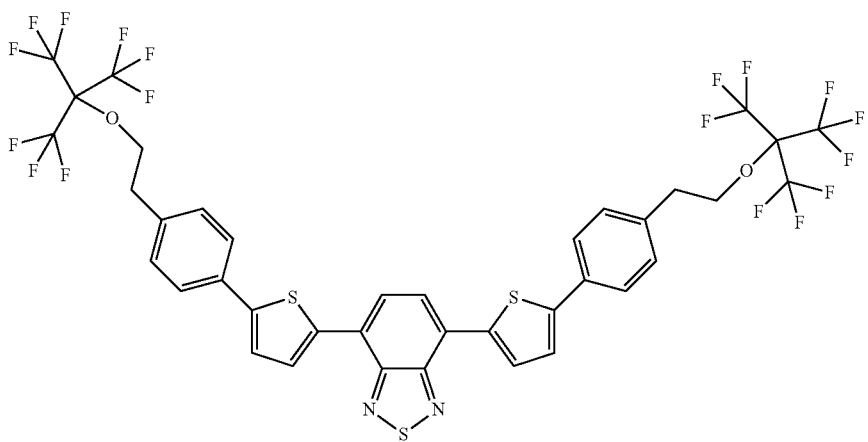
25
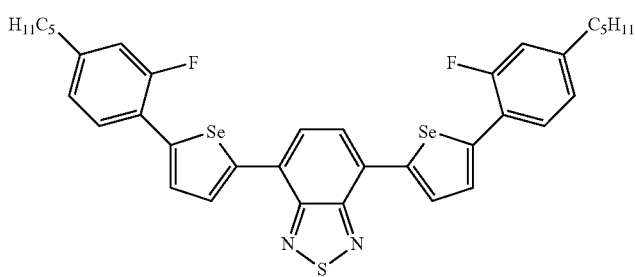
26

-continued
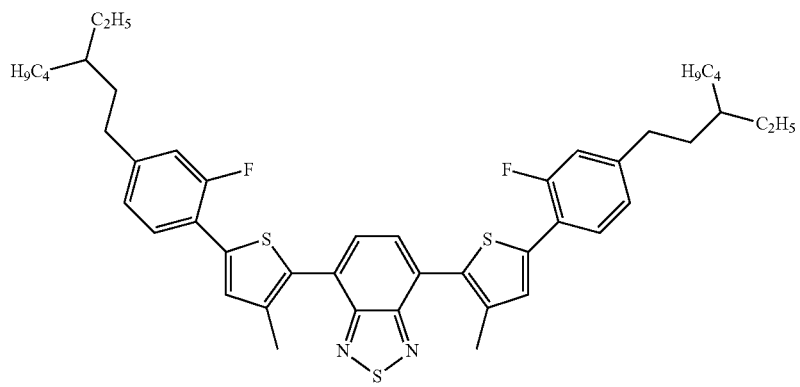
27
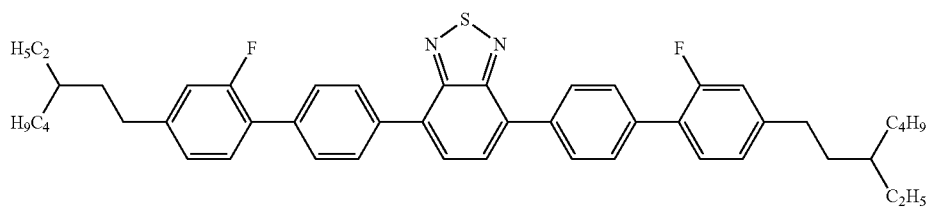
28
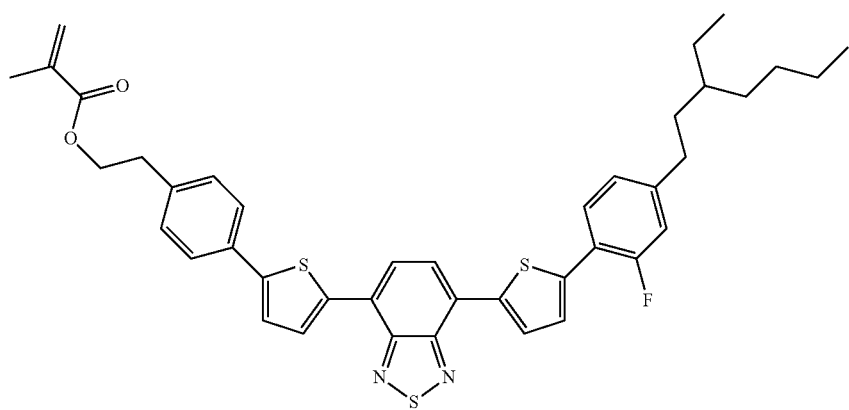
29
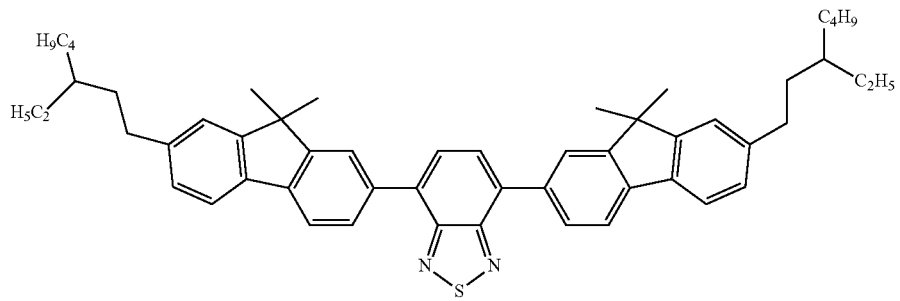
30
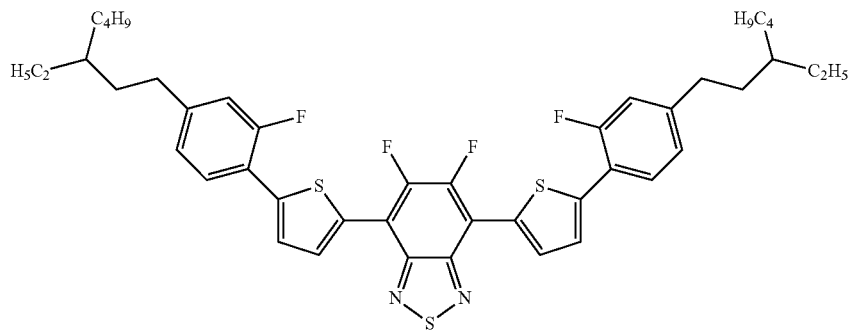
31

-continued
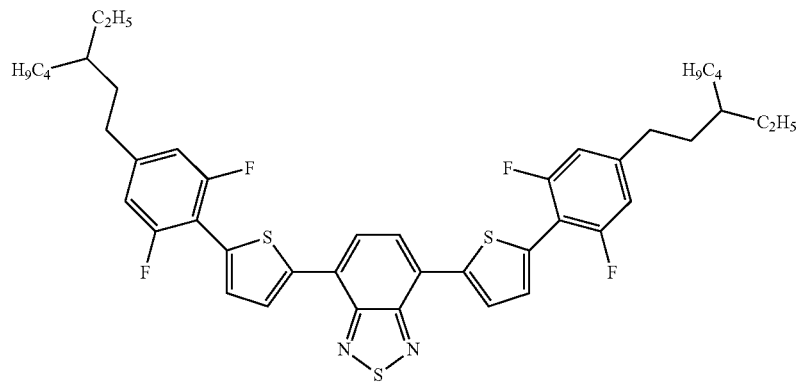
32
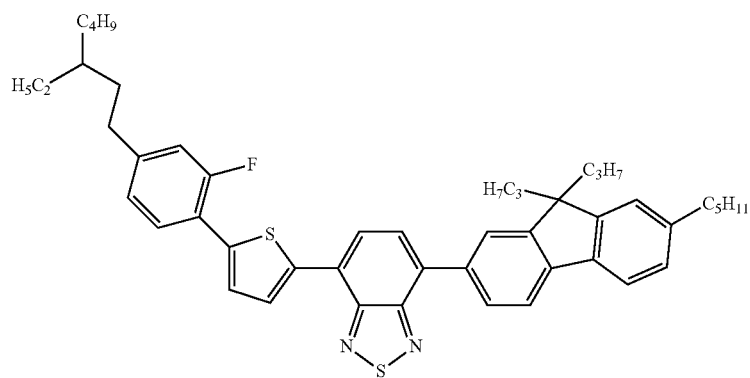
33
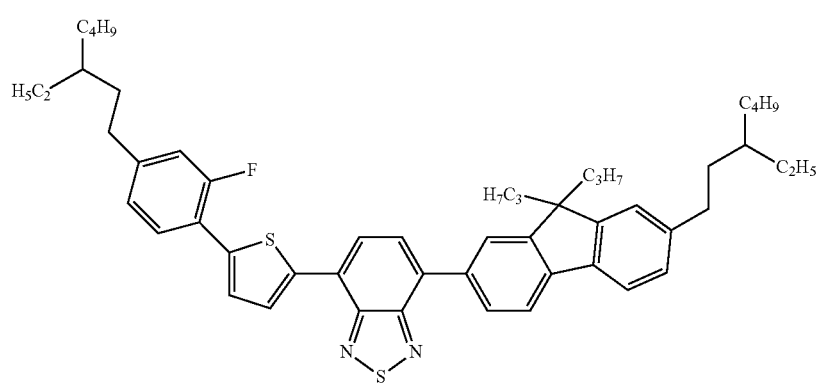
34
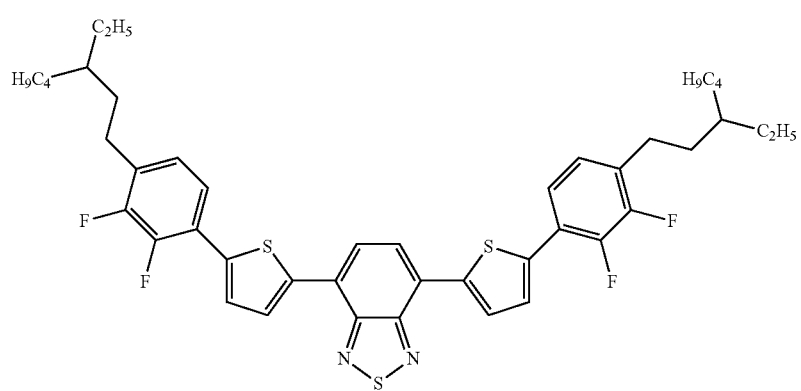
35

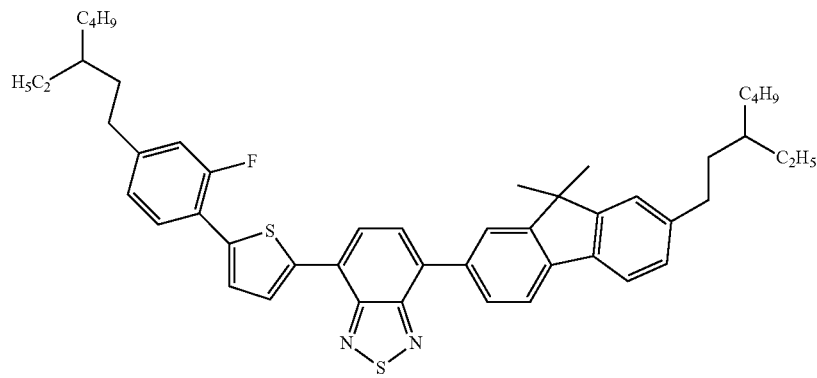
36
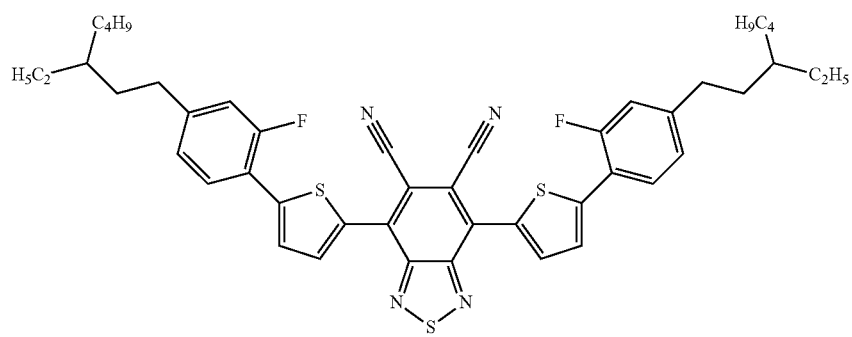
37
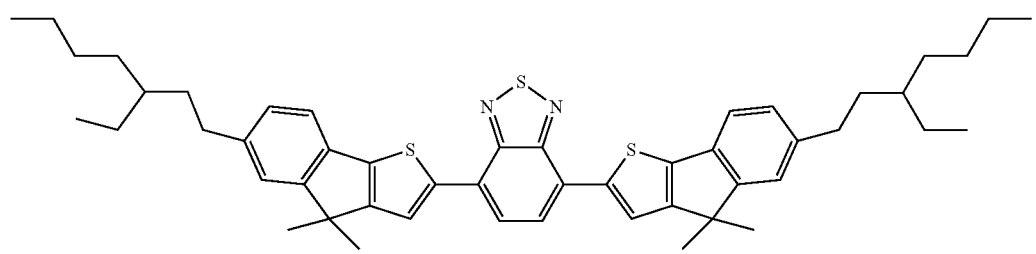
38
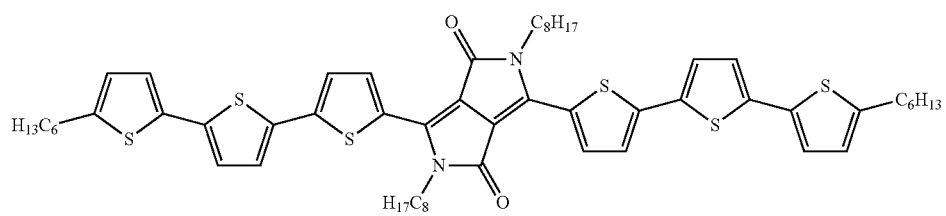
39
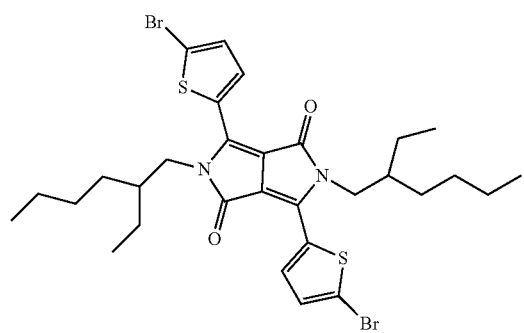
40

-continued
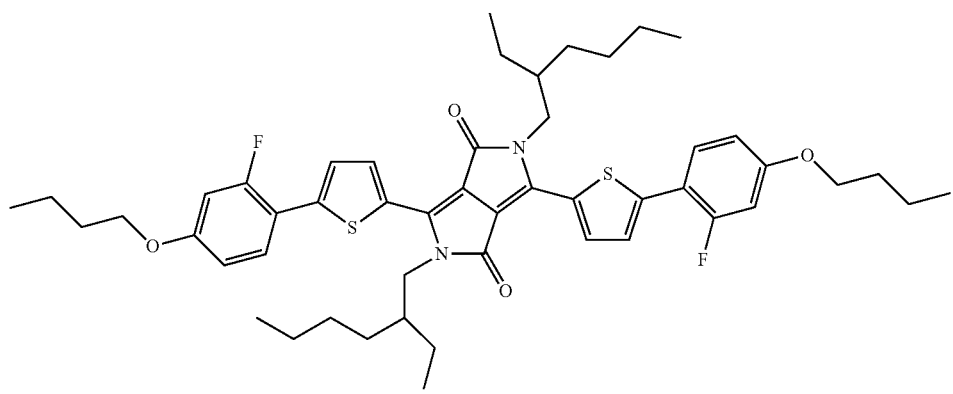
41
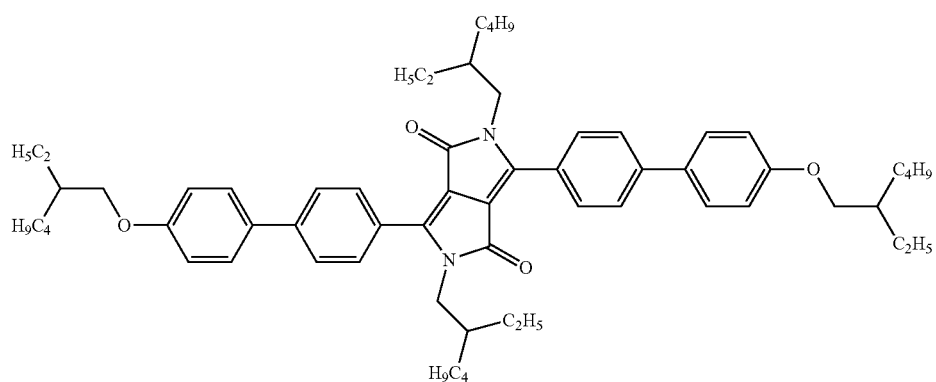
42
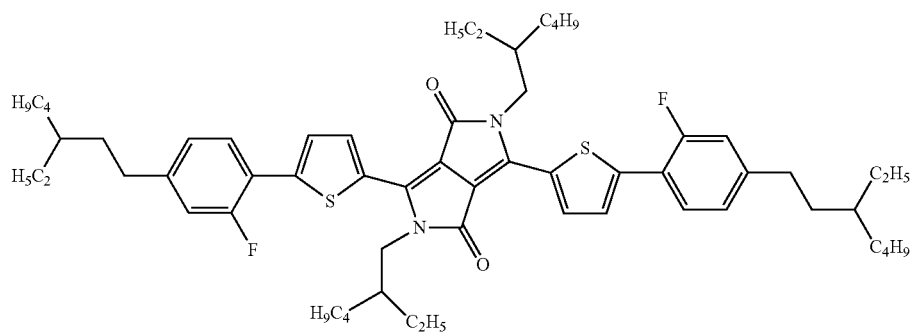
43
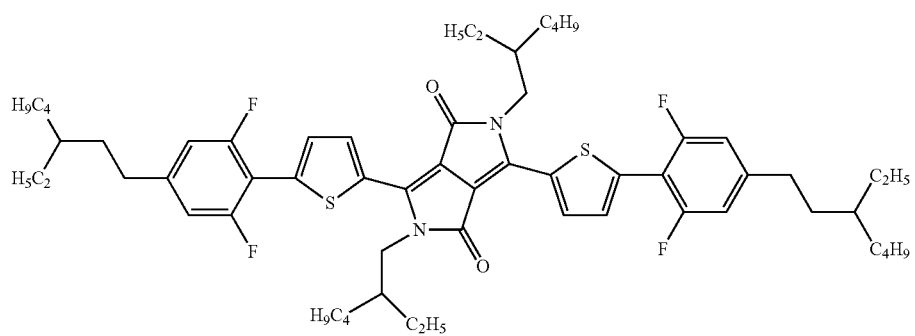
44

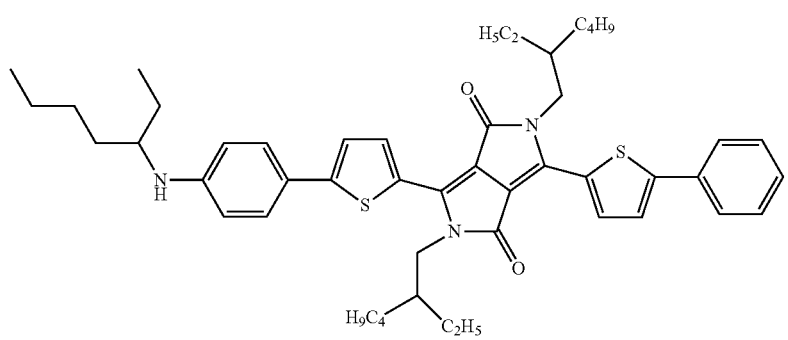
45
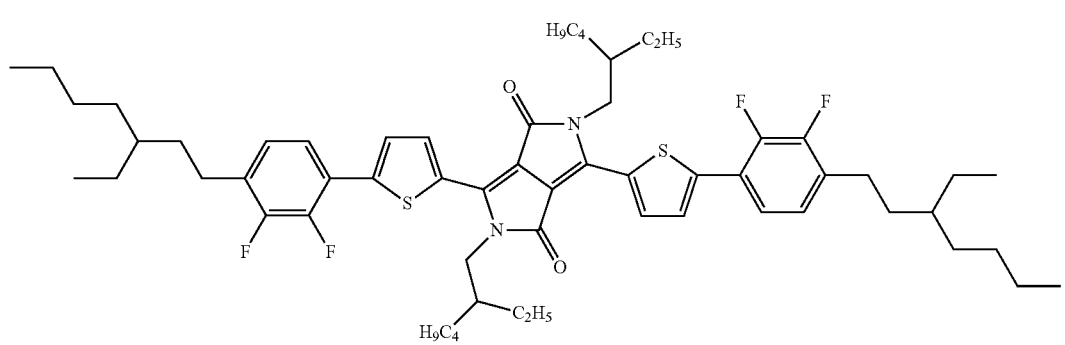
46
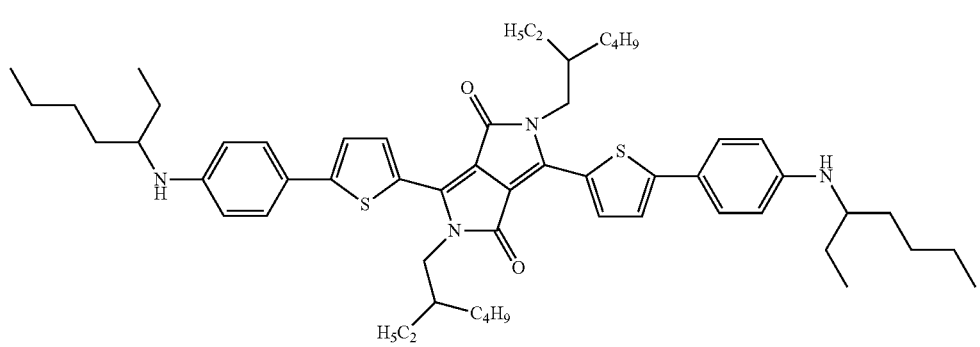
47
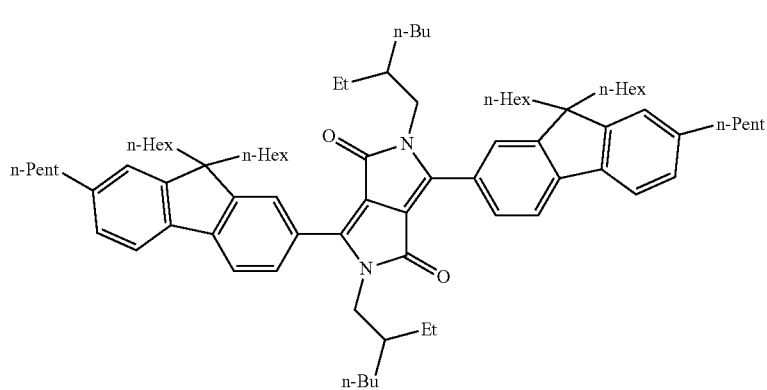
48

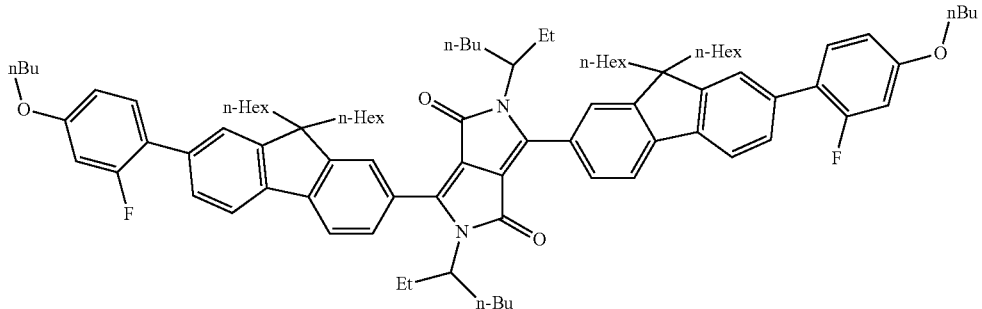
49
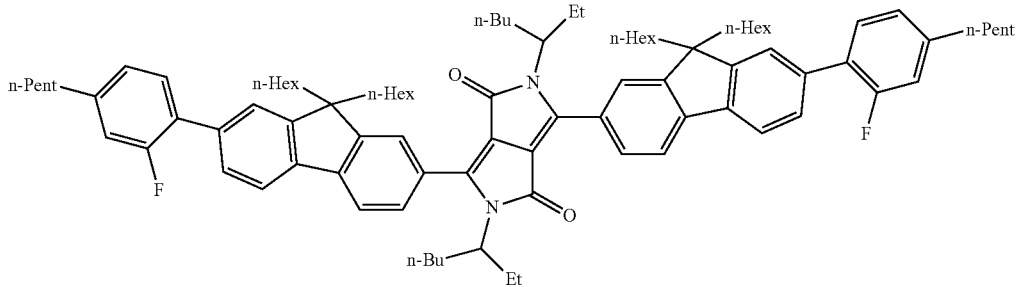
50
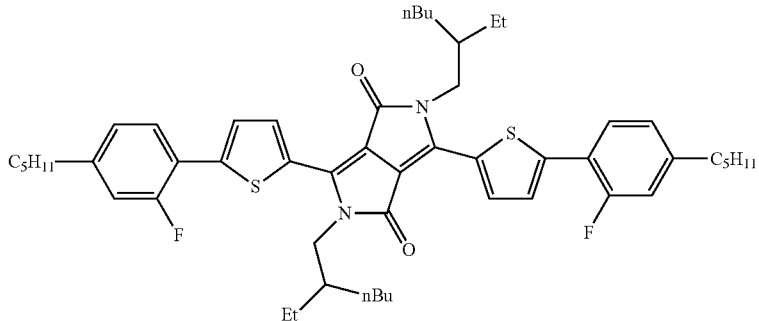
51
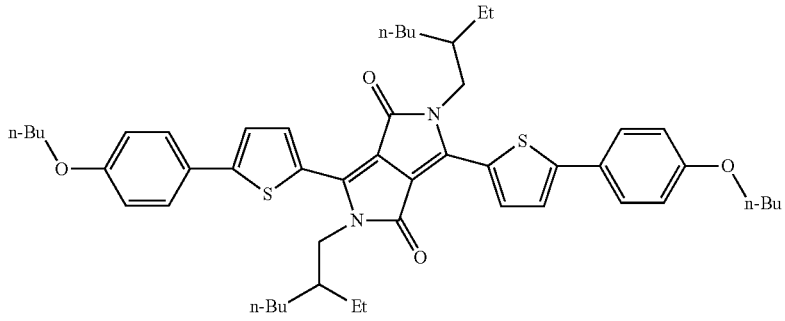
52
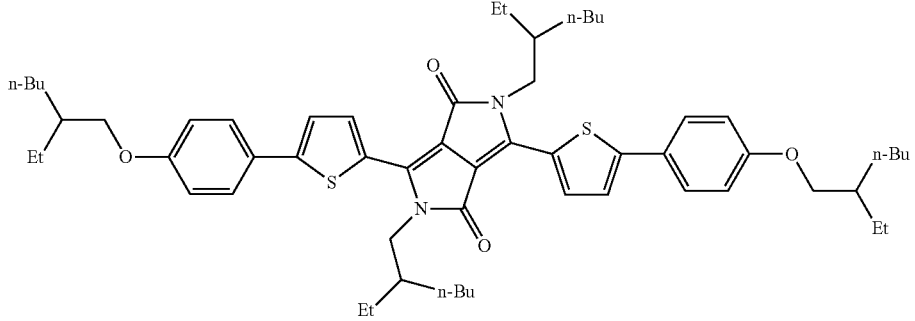
53

54
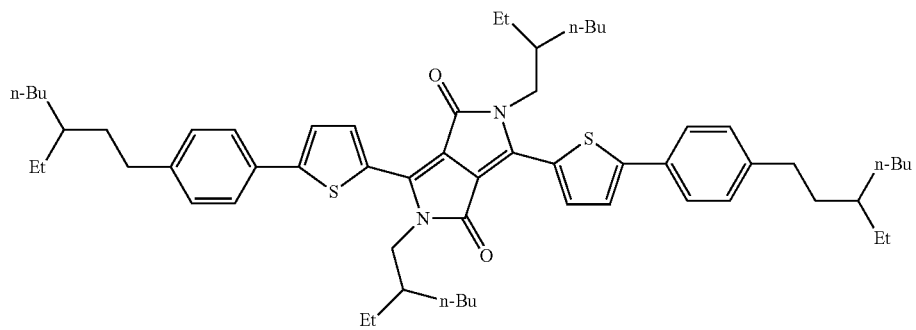
55
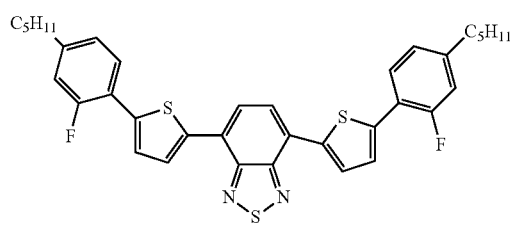
56
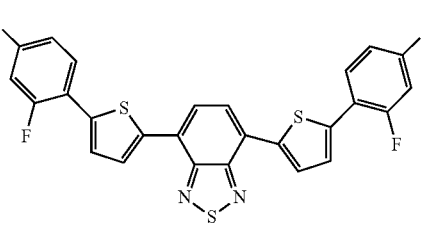
57
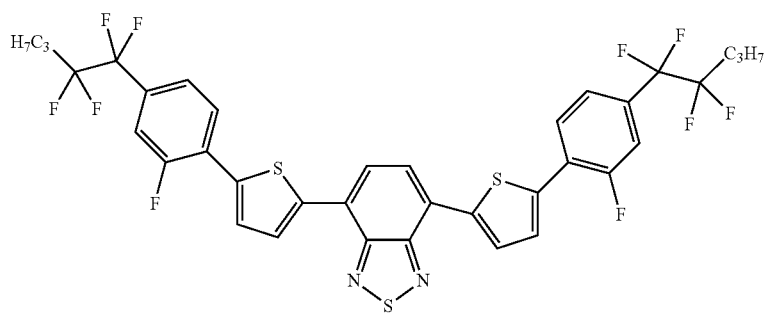
58
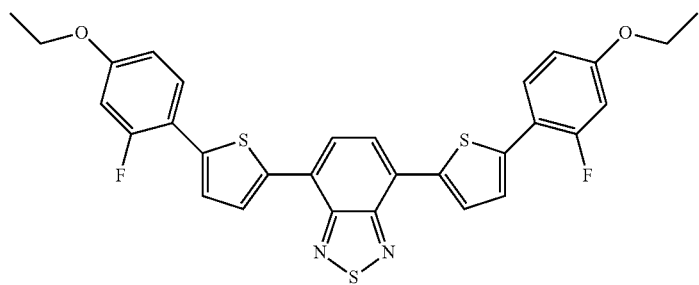
59
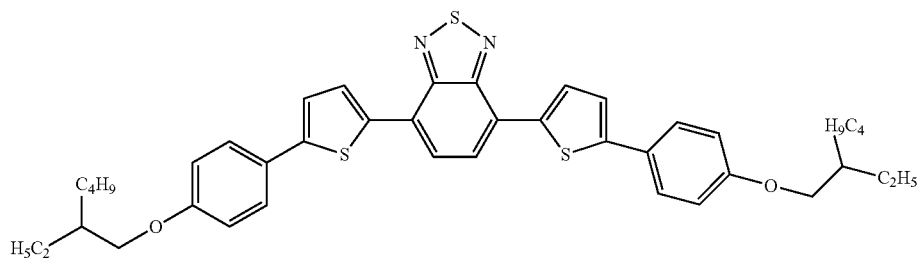

60
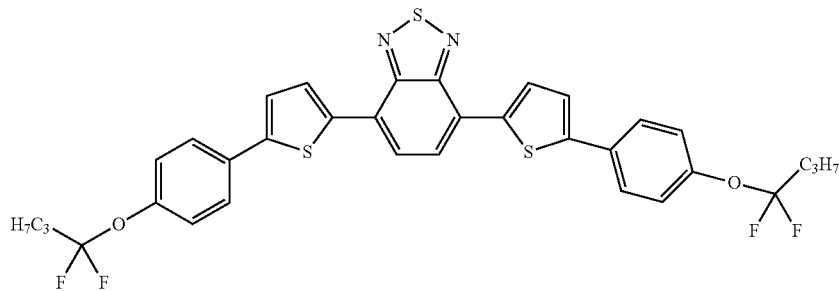
61
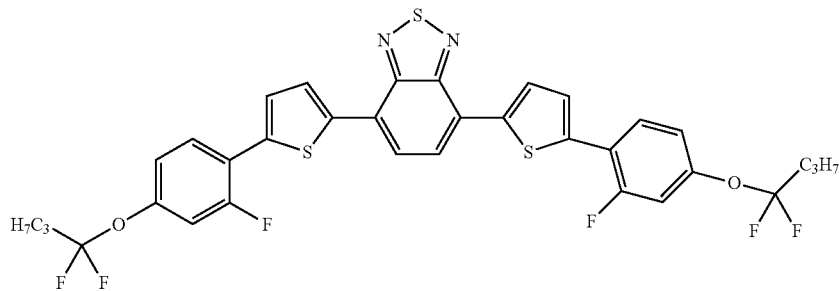
62
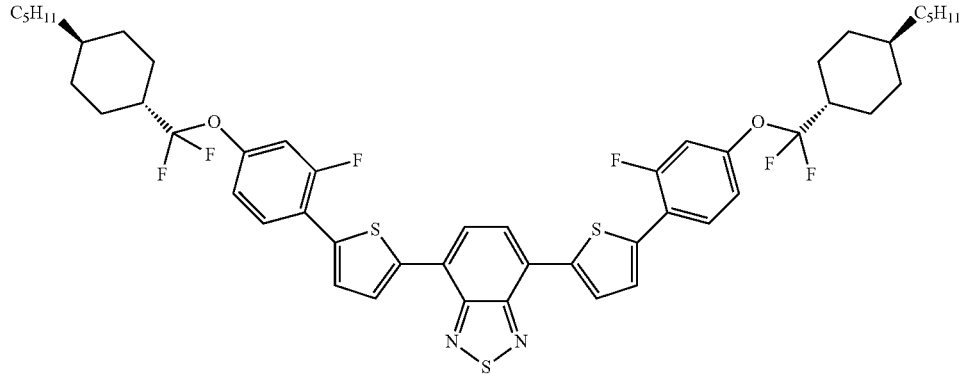
63
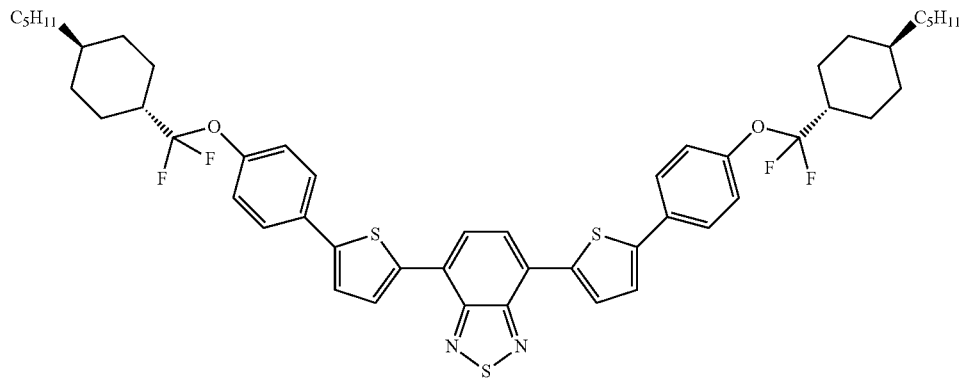
64
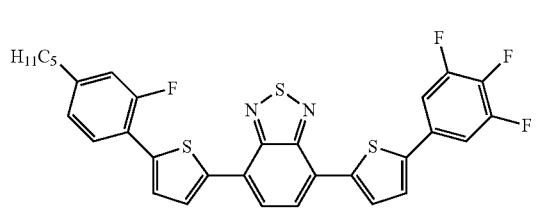
65
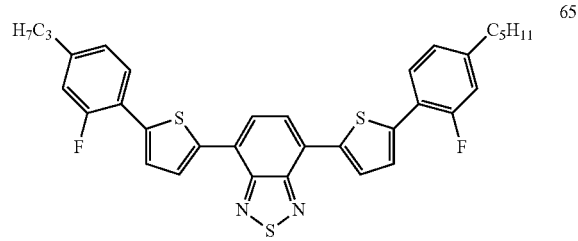

-continued
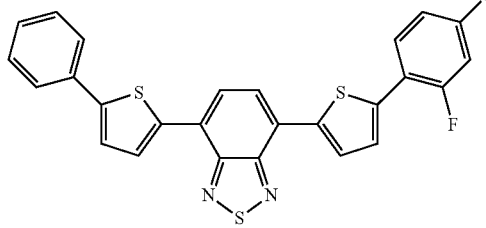
66
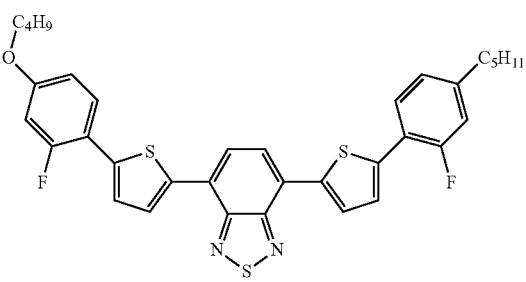
67
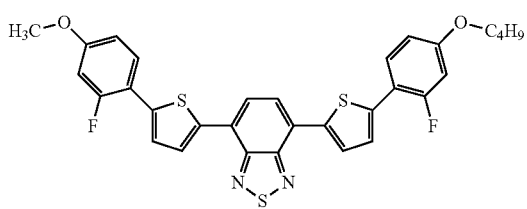
68
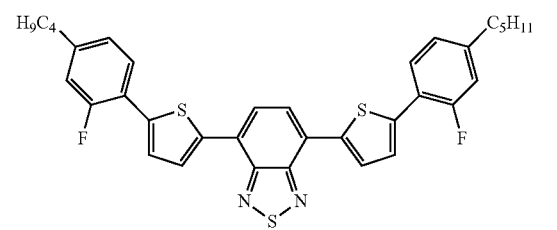
69
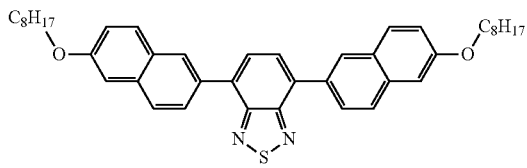
70
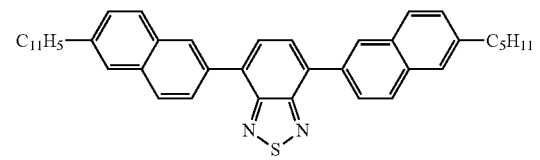
71
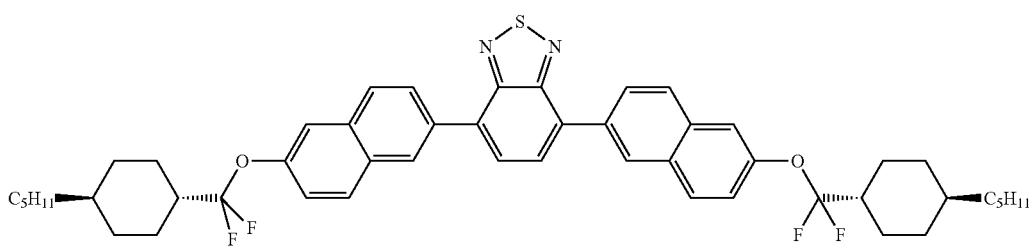
72
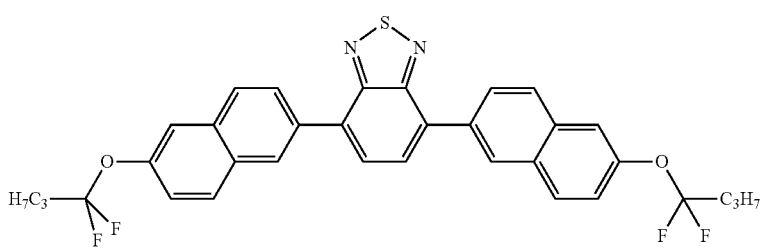
73
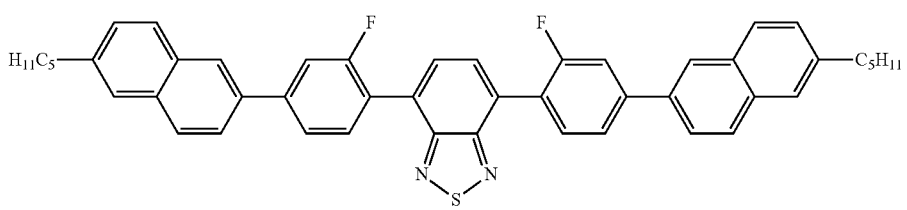
74
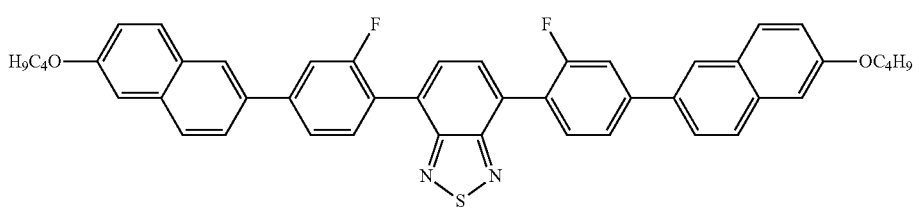
75

76
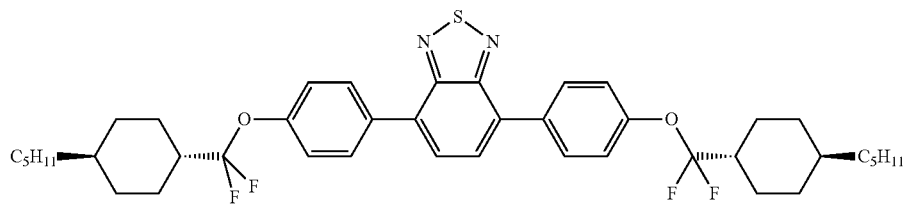
77
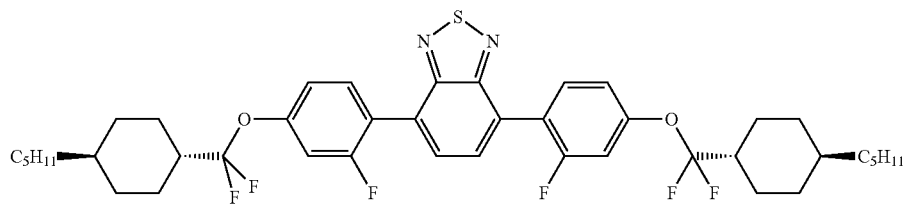
78
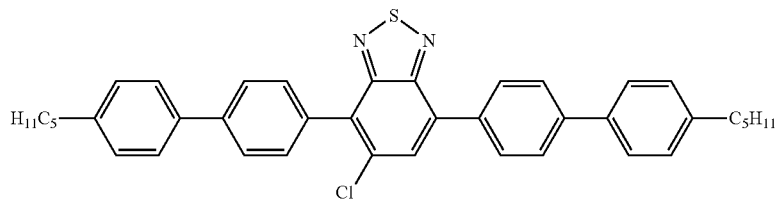
79
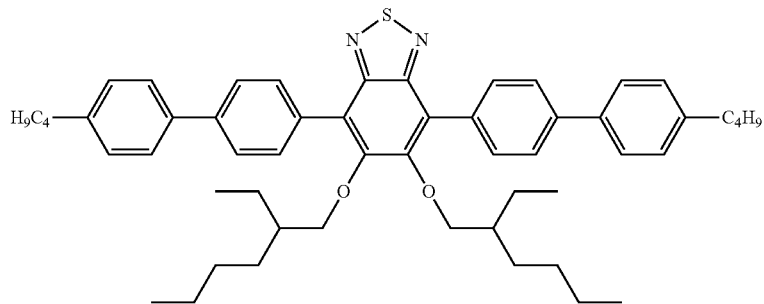
80
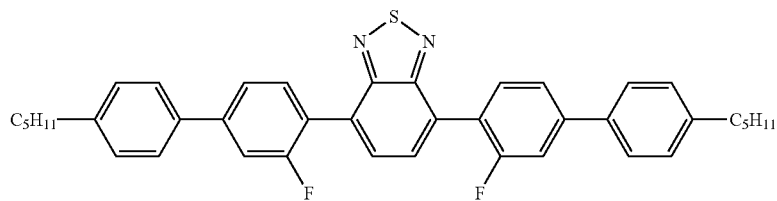
81
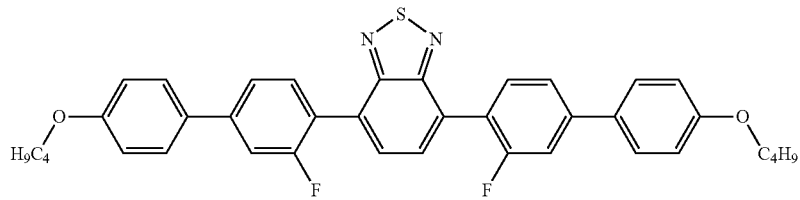
82
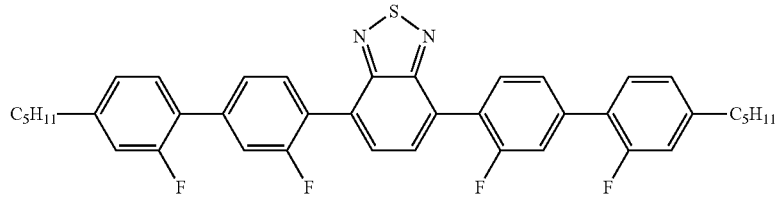

83
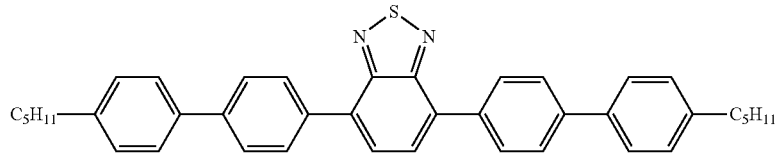
84
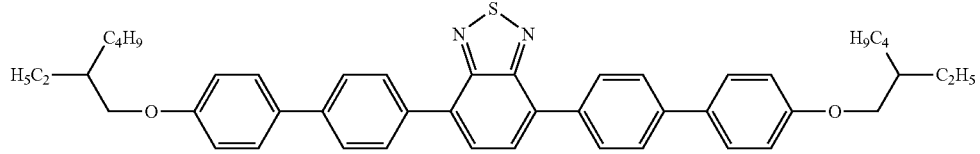
85
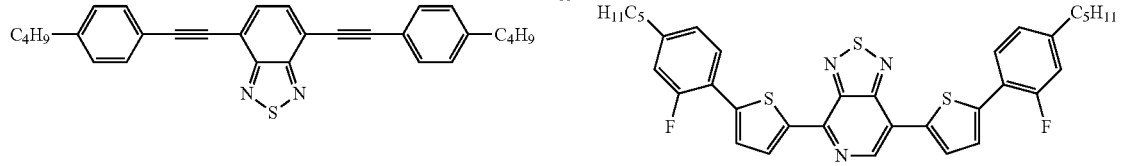
86
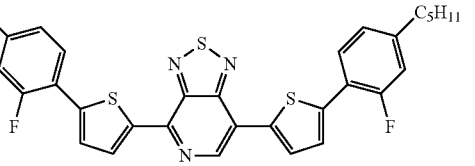
87
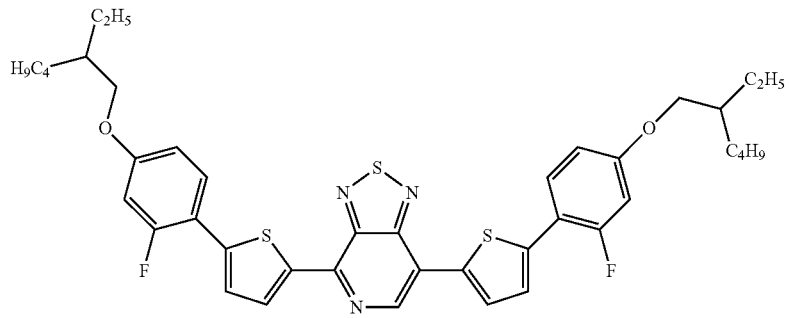
88
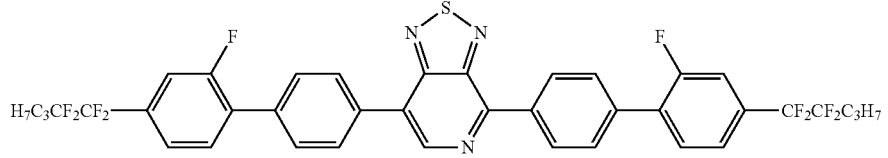
89
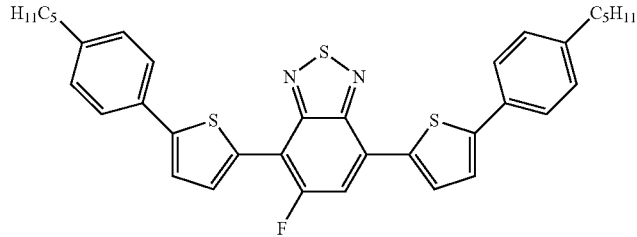
90
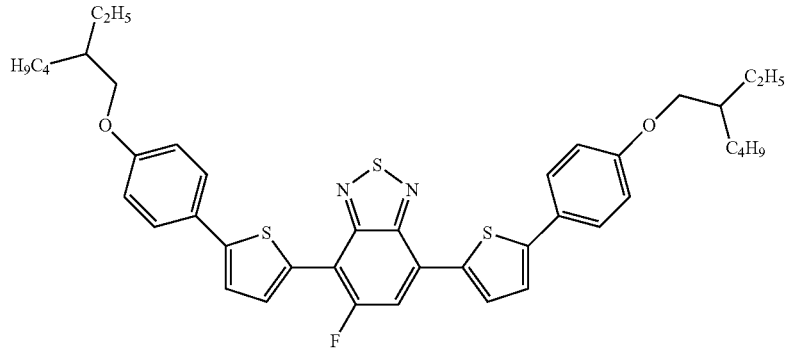

91
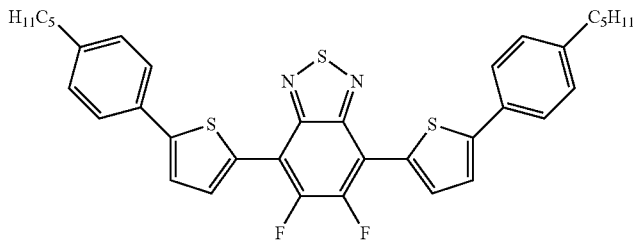
92
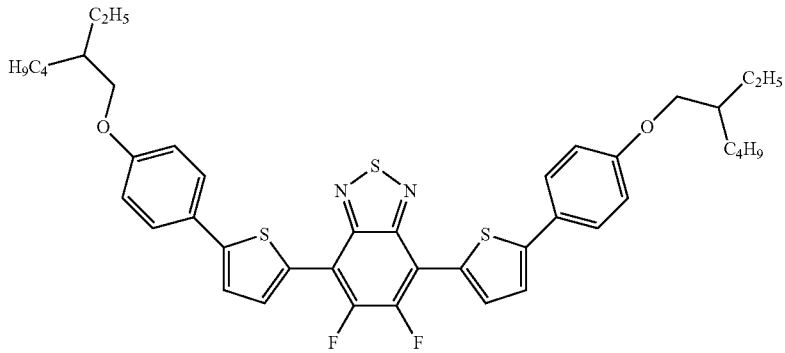
93
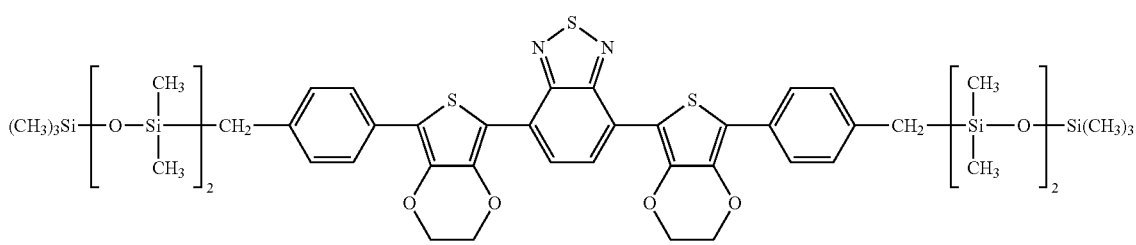
94
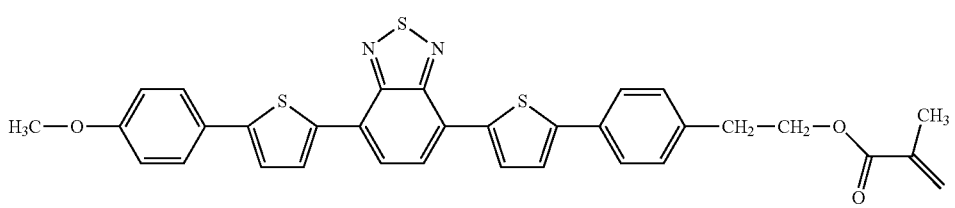
95
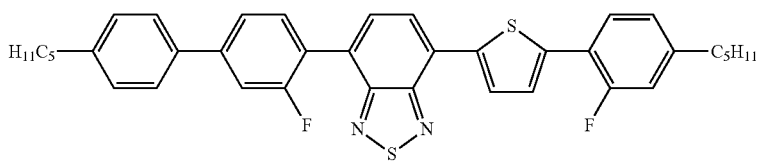
96
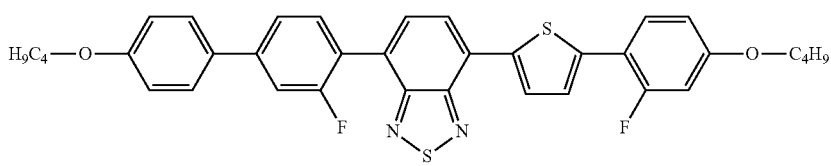
97
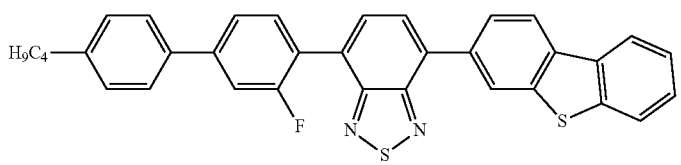

-continued
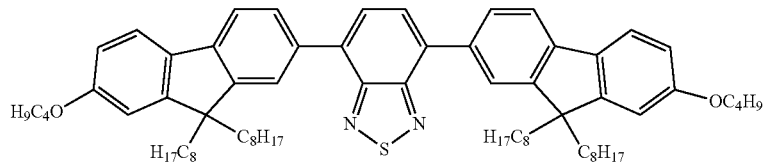
98
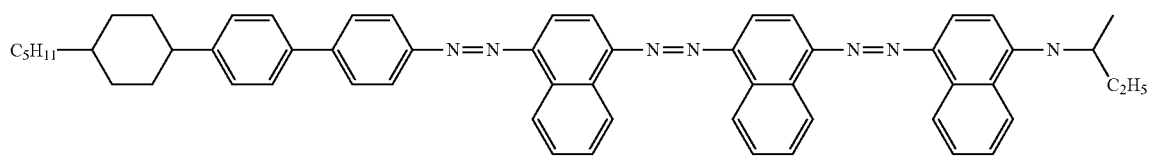
99
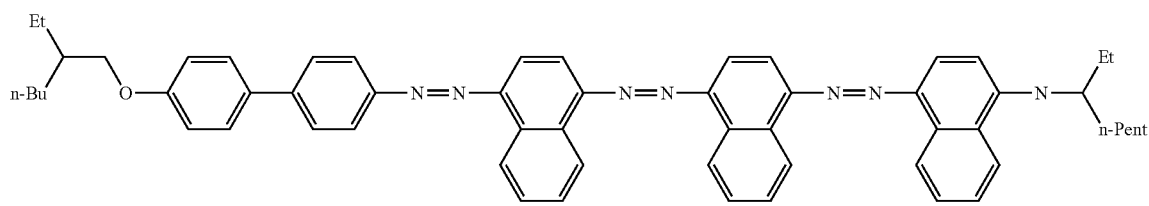
100
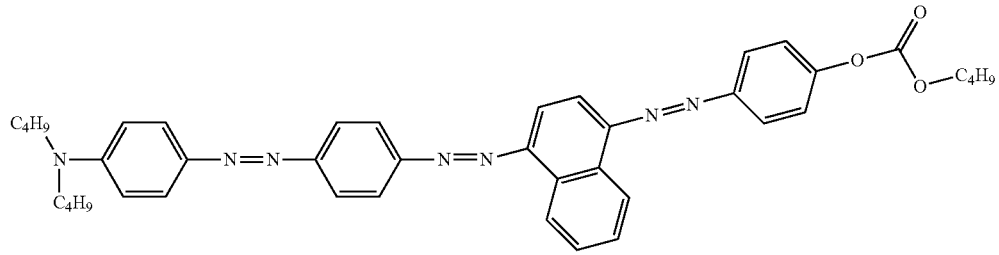
101
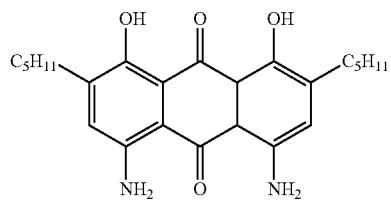
102
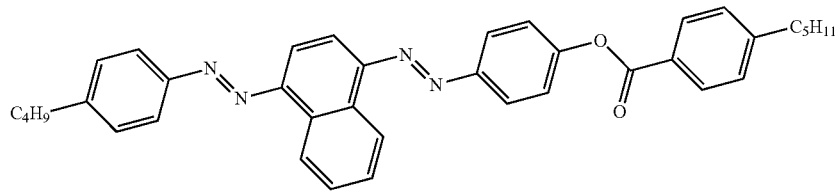
103
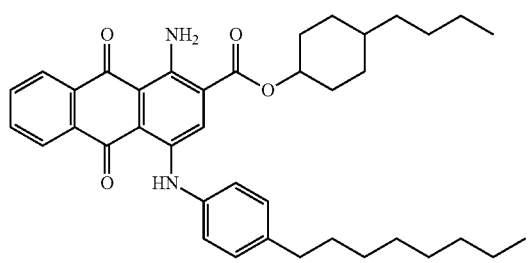
104
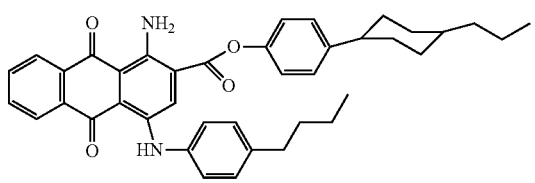
105

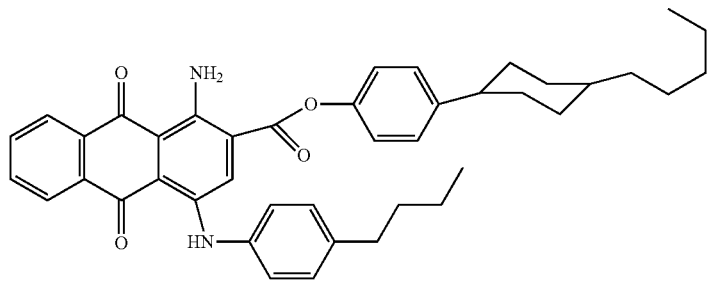

106

The liquid-crystalline material preferably comprises a chiral dopant. Chiral dopants are preferably employed in a total concentration of 0.01% by weight to 3% by weight, particularly preferably from 0.05% by weight to 1 by weight. In order to obtain high values for the twist of the molecules of the liquid-crystalline material, the total concentration of the chiral dopants may also be selected higher than 3% by weight, preferably up to a maximum of 15% by weight.

Preferred chiral dopants are the compounds depicted in the following table:

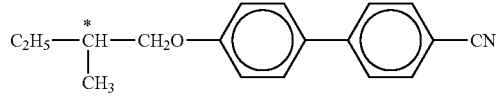

CD1

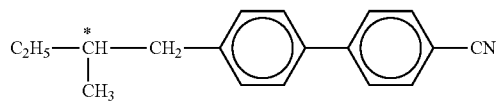

CD2

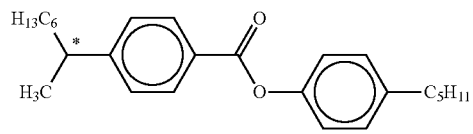

CD3

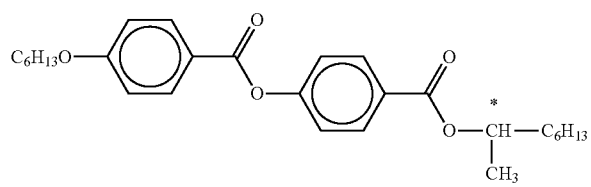

CD4

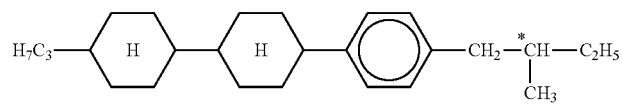

CD5

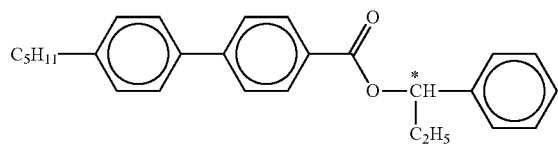

CD6

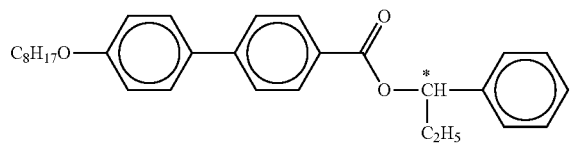

CD7

-continued

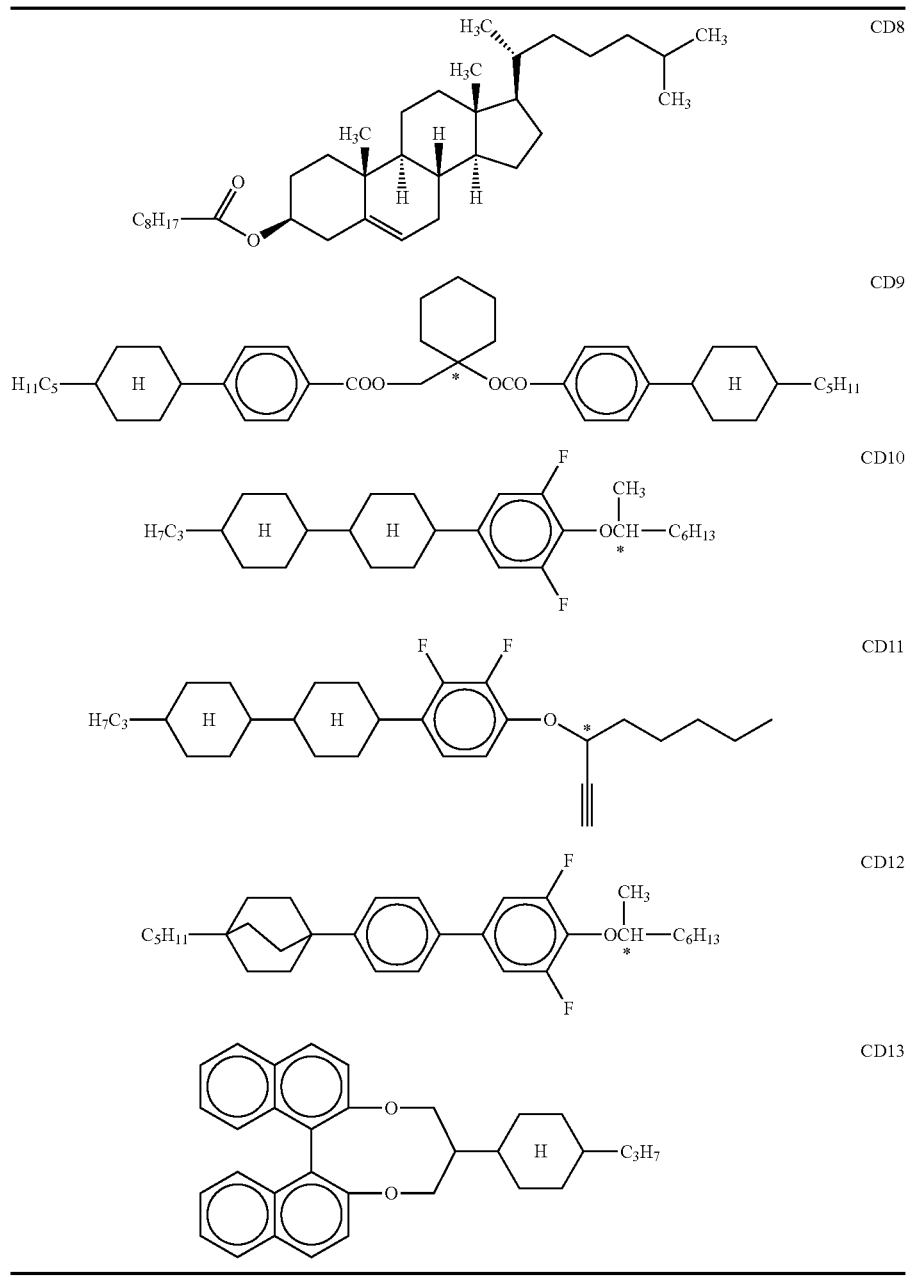

The liquid-crystalline material, as defined above, can in principle be used in any desired optical switching device. The optical switching device can be used in display devices or in switchable windows. Preference is given to the use in switchable windows, in particular in switchable windows which contain a switchable layer comprising the liquid-crystalline material according to the invention.

The liquid-crystalline material is preferably used in a device for the regulation of the passage of sunlight.

The invention thus relates to an optical switching device for regulation of the passage of sunlight, containing a layer of a liquid-crystalline material, characterised in that the liquid-crystalline material comprises a compound (I), as defined above, and a dye. The optical switching device preferably regulates the passage of light through an area element. The passage of light is furthermore preferably regulated homogeneously over the area of the area element. Homogeneous regulation here is taken to mean that the transmission is substantially the same at all points within the area element.

The area element here preferably has a dimension of at least 0.05 m², particularly preferably at least 0.1 m², especially preferably at least 0.5 m² and very particularly preferably at least 0.8 m².

The liquid-crystalline material is preferably present in the device in the form of a layer. This layer is preferably switchable, i.e. is adjustable in its light transmissivity, and is therefore also referred to as a switching layer. The layer preferably has a thickness of 12 to 40 μm, particularly preferably of 14 to 30 μm and very particularly preferably of 15 to 25 μm.

The device according to the invention is preferably suitable for the regulation of the passage of light in the form of sunlight from the environment into a space. The space here can be any desired space that is substantially sealed off from the environment, for example a building, a vehicle or a container. The device can generally be used for any desired spaces, particularly if these have only limited exchange of air with the environment and have light-transmitting boundary surfaces through which the entry of energy from the outside in the form of light energy can take place. The device is particularly preferably used for spaces which are subjected to strong insolation through light-transmitting areas, for example through window areas. Examples thereof are spaces having large window areas to the outside and the insides of motor vehicles, in particular of automobiles.

The device according to the invention is preferably arranged in an opening of a relatively large two-dimensional structure, where the two-dimensional structure itself only allows little passage of light or none at all, and where the opening transmits light to a greater extent in relative terms. The two-dimensional structure is preferably a wall or another delimitation of a space to the outside.

The device according to the invention is switchable. Switching here is taken to mean a change in the passage of light through the device. The device according to the invention is preferably electrically switchable. In this case, it preferably comprises two or more electrodes, which are installed on both sides of the layer comprising the liquid-crystalline material. The electrodes preferably consist of ITO or a thin, preferably transparent metal and/or metal-oxide layer, for example silver or FTO (fluorine-doped tin oxide), or an alternative material known to the person skilled in the art for this use. The ITO electrodes may be provided with a passivation layer, for example comprising $SiO_2$. The electrodes are preferably provided with electrical connections. The voltage is preferably provided by a battery, a rechargeable battery or an external power supply.

In the case of electrical switching, the switching operation takes place through alignment of the molecules of the liquid-crystalline material in the liquid-crystalline state by application of voltage.

In a preferred embodiment, the device is converted from a state having high absorption, i.e. low light transmissivity, which is present without voltage, into a state having lower absorption, i.e. higher light transmissivity, by application of a voltage. The liquid-crystalline material in the layer in the device is preferably nematically liquid-crystalline in both states. The voltage-free state is preferably characterised in that the molecules of the liquid-crystalline material in the liquid-crystalline state, and thus the molecules of the dye, are aligned parallel to the plane of the switching layer. This is preferably achieved by a correspondingly selected alignment layer. In this case, the molecules are preferably untwisted and are aligned parallel to the plane of the switching layer. The state under voltage is preferably characterised in that the molecules of the liquid-crystalline material, and thus the molecules of the dye, are perpendicular to the plane of the switching layer.

According to an embodiment which is preferred under certain conditions, the molecules of the liquid-crystalline material in the voltage-free state are in twisted nematic form and are parallel to the plane of the switching layer. In the state under voltage, they are perpendicular to the plane of the switching layer.

According to an alternative embodiment, which is likewise preferred under certain conditions, the molecules in the voltage-free state are perpendicular to the plane of the switching layer. This is preferably achieved by correspondingly designed alignment layers. In the state under voltage, they are in this case parallel to the plane of the switching layer. They can be in either twisted or untwisted form here.

According to a preferred embodiment of the invention, the device can be operated without an external power supply by providing the energy required by means of a solar cell or another device for the conversion of light and/or heat energy into electrical energy which is connected to the device. The provision of the energy by means of the solar cell can take place directly or indirectly, i.e. via a battery or rechargeable battery or other unit for the storage of energy connected in-between. The solar cell is preferably installed on the outside of the device or is an internal component of the device, as disclosed, for example, in WO 2009/141295.

The device according to the invention preferably has the following layer sequence, where further layers may additionally be present. The layers indicated below are preferably directly adjacent to one another in the device:
  substrate layer, preferably comprising glass or polymer
  electrically conductive transparent layer, preferably comprising ITO
  alignment layer
  switching layer comprising the material according to the invention
  alignment layer
  electrically conductive transparent layer, preferably comprising ITO
  substrate layer, preferably comprising glass or polymer Preference is given to an embodiment which comprises two LC cells arranged one the behind the other in the layer sequence indicated above, in particular as disclosed in WO 2014/180525.

The preferred embodiments of the individual layers are described below.

The device according to the invention preferably comprises one or more, particularly preferably two, alignment layers. The alignment layers are preferably directly adjacent to the two sides of the layer comprising the liquid-crystalline material.

The alignment layers used in the device according to the invention can be any desired layers known to the person skilled in the art for this purpose. Preference is given to polyimide layers, particularly preferably layers comprising rubbed polyimide. Polyimide rubbed in a certain manner known to the person skilled in the art results in alignment of the molecules of the liquid-crystalline material in the liquid-crystalline state in the rubbing direction if the molecules are parallel to the alignment layer (planar alignment). It is preferred here for the molecules of the liquid-crystalline material in the liquid-crystalline state not to be completely planar on the alignment layer, but instead to have a slight pretilt angle. In order to achieve vertical alignment of the molecules to the surface of the alignment layer (homeotropic alignment), polyimide treated in a certain manner is preferably employed as material for the alignment layer (polyimide for very high pretilt angles). Furthermore, polymers obtained by an exposure process with polarised light can be used as alignment layer in order to achieve alignment of the molecules in accordance with an alignment axis (photoalignment).

If the molecules of the liquid-crystalline material are twisted and at least one switching state, the rubbing directions of the two alignment layers which surround the switching layer comprising the liquid-crystalline material in the device according to invention preferably include an angle of 30° to 270°.

The layer comprising the liquid-crystalline material in the device according to the invention is furthermore preferably arranged between two substrate layers or enclosed thereby. The substrate layers can consist, for example, of glass or a polymer, preferably a light-transmitting polymer.

The device is preferably characterised in that it contains precisely one polariser. This is preferably a linear polariser.

According to an alternative embodiment, the device does not contain a polymer-based polariser, particularly preferably does not contain a polariser in the solid material phase and very particularly preferably contains no polariser at all.

The device according to the invention furthermore preferably contains an optical waveguide system which transports light to a solar cell or another device for the conversion of light and/or heat energy into electrical energy, preferably as described in WO 2009/141295.

In a preferred embodiment, the device according to the invention is a component of a window which can be switched in its light transmission, particularly preferably a window containing at least one glass area, very particularly preferably a window which contains multipane insulating glass.

Window here is taken to mean, in particular, a structure in a building which comprises a frame and at least one glass pane surrounded by this frame. It preferably comprises a heat-insulating frame and two or more glass panes (multipane insulating glass).

According to a preferred embodiment, the device according to the invention is applied directly to a glass area of a window, particularly preferably in the interspace between two glass panes of multipane insulating glass.

Furthermore, the device is preferably used as active, switching component of partly light-transparent, switchable automobile roofs or of switchable automobile windows.

The layer sequence here is preferably
polarisation layer
substrate layer, preferably comprising glass or polymer
electrically conductive transparent layer, preferably comprising ITO
alignment layer
switching layer comprising the material according to the invention
alignment layer
electrically conductive transparent layer, preferably comprising ITO
substrate layer, preferably comprising glass or polymer,
where the polarisation layer faces outwards, towards the light source, in particular towards the sun.

It is preferred that one or more further layers are located between the polariser and substrate layer. These layers preferably compensate for the different coefficients of thermal expansion of polarisation layer and substrate layer. Layers selected from adhesive layers and adhesive films, for example Optically Clear Adhesive von 3M, are preferred for this purpose.

Alternatively, the polarisation layer may also be located between the two substrate layers or on the side of the device facing away from the sun. In this case, it is preferred that the layers located on the outside of the switching layer absorb UV light. It is particularly preferred that the substrate layer comprises UV-absorbent additives, or that a UV filter is applied to the substrate layer.

The substrate layers are preferably optically anisotropic. In particular, they are not or only slightly birefringent. They preferably have no or only low voltage birefringence. This can be achieved, in particular, by means of polymer substrate layers.

Furthermore, it is preferred, in the case of the use of the device in switchable automobile roofs or automobile windows, that the device is not flat, but instead is curved in space. This is preferably achieved by the use of curved substrate layers.

WORKING EXAMPLES

1) Preparation of the Liquid-Crystalline Mixtures

The base mixture uses the following mixture M1:

| Composition of host mixture M1 | | |
|---|---|---|
| Clearing point | | 114.5° C. |
| Delta-n | | 0.1342 |
| $n_e$ | | 1.6293 |
| $n_o$ | | 1.4951 |
| Composition | Compound | % by weight |
| | CPG-3-F | 5 |
| | CPG-5-F | 5 |
| | CPU-3-F | 15 |
| | CPU-5-F | 15 |
| | CP-3-N | 16 |
| | CP-5-N | 16 |
| | CCGU-3-F | 7 |
| | CGPC-3-3 | 4 |
| | CGPC-5-3 | 4 |
| | CGPC-5-5 | 4 |
| | CCZPC-3-3 | 3 |
| | CCZPC-3-4 | 3 |
| | CCZPC-3-5 | 3 |

Mixture M1-F is obtained by adding dyes F1, F2 and F3 to mixture M1 in the proportions by weight indicated:

| Dye | Proportion by weight (% by weight) |
|---|---|
| F1 | 0.385 |
| F2 | 0.73 |
| F3 | 0.84 |

Structures of the Dyes:

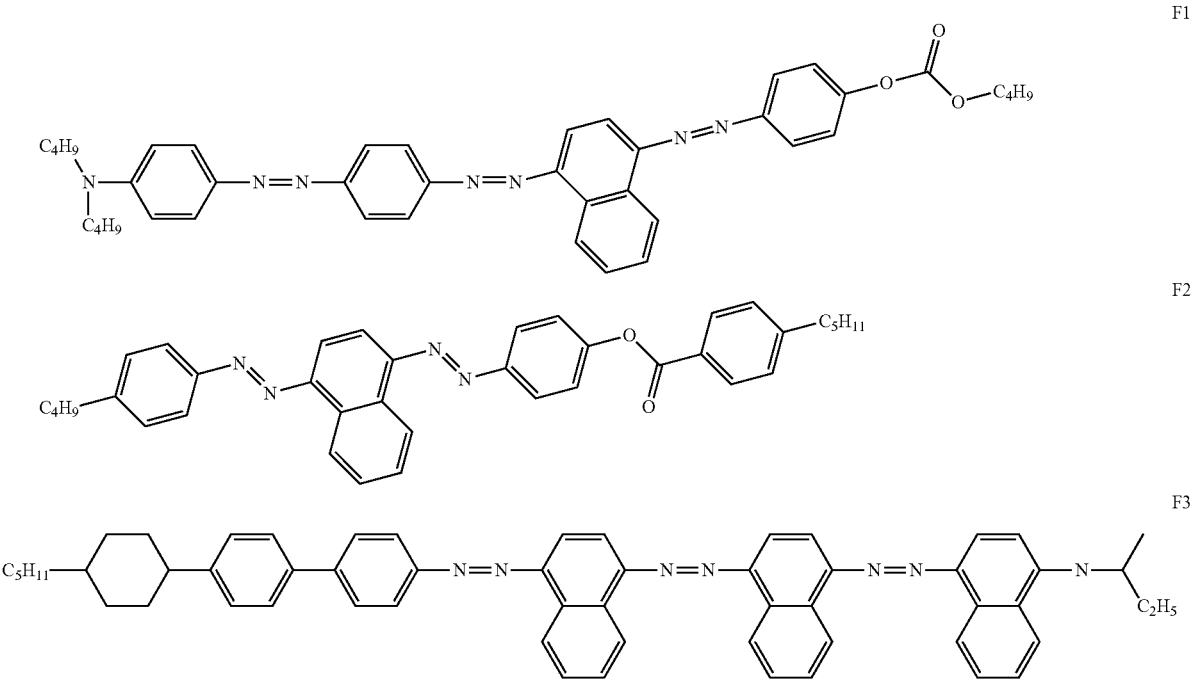

The following liquid-crystalline mixtures are prepared from mixture M1-F by addition of additives A1 and/or A2:

|     | Proportion of compound A1 (% by weight) | Proportion of compound A2 (% by weight) |
|-----|------|------|
| LC1  | 0.03 | 0    |
| LC2  | 0.06 | 0    |
| LC3  | 0.1  | 0    |
| LC4  | 0.25 | 0    |
| LC5  | 0.5  | 0    |
| LC6  | 0.1  | 0.1  |
| LC7  | 0.1  | 0.03 |
| LC8  | 0.15 | 0.05 |
| LC9  | 0.05 | 0.15 |
| LC10 | 0.15 | 0.15 |

Furthermore, the following liquid-crystalline mixtures are prepared as reference:

|       | Proportion of compound A2 (% by weight) | Proportion of compound A3 (% by weight) | Proportion of compound A4 (% by weight) |
|-------|------|-----|-----|
| V-LC1 | 0.03 | 0   | 0   |
| V-LC2 | 0.1  | 0   | 0   |
| V-LC3 | 0    | 0.1 | 0   |
| V-LC4 | 0    | 0   | 0.1 |

Additives A1, A2, A3 and A4 have the following structures:

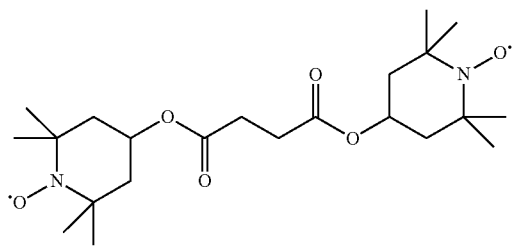

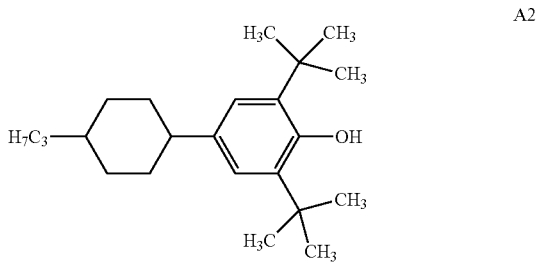

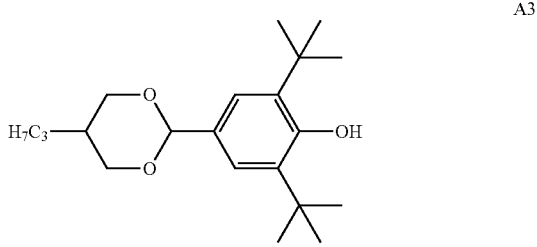

-continued

A4

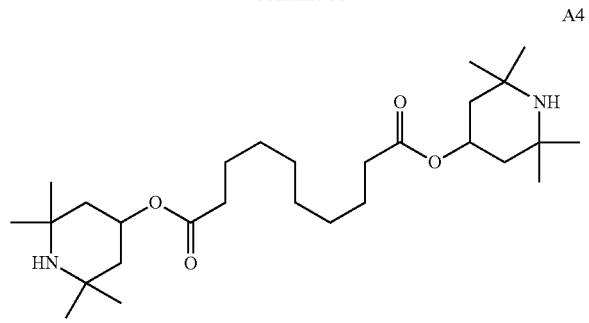

The mixtures are introduced into LC cells with polyimide alignment layers (rubbed antiparallel, polyimide AL-1054 for planar alignment). The layer thickness of the layer comprising the mixtures is 25 μm. The cells are sealed using UV adhesive (Norland).

The light exposure test is carried out on the cells as follows:

The cells are measured spectroscopically (initial value). They are then exposed to light for 16 weeks in a Suntest CPS+ from MTS Atlas with the setting Black Standard Temperature 70° C. (=surface temperature of the samples) and using a Schott GG400 UV edge filter, which screens the sample hermetically against relatively short-wave UV light.

The heat exposure test is carried out on the cells as follows:

The samples are measured spectroscopically (initial value) and then stored in an oven at 100° C. for 7 days. The spectrum is subsequently remeasured at room temperature.

Determination of the colour values and the colour separation $\Delta E^*$:

The x, y, and z values are determined from the transmission curves of the respective spectra by the method described by M. Richter, Einführung in die Farbmetrik [Introduction into Colorimetry] (Sammlung Göschen, Volume 2608). The x, y and z values are used to determine $L^*, a^*, b^*$ and from these the corresponding differences $\Delta L^*$, $\Delta a^*$ and $\Delta b^*$, by the method described by M. Richter, Einführung in die Farbmetrik [Introduction into Colorimetry]. The spectrometer used is a Perkin Elmer Lambda 1050.

Finally, the colour separation (colour difference) $\Delta E^*$ calculated in the Lab colour space is calculated as follows:

$$\Delta E^* = [(\Delta L^*)^2 + (\Delta a^*)^2 + (\Delta b^*)^2]^{0.5}$$

The following results are obtained for the cells produced:

| Device containing | ΔE* after light exposure test | ΔE* after heat exposure test |
|---|---|---|
| LC1 | 6 | 5.3 |
| LC2 | 5.5 | 5.4 |
| LC3 | 3.1 | 5.5 |
| LC4 | 1.8 | 5.4 |
| LC5 | 4.1 | 5.3 |
| LC6 | 3.1 | 0.3 |
| LC7 | 2.9 | 1.1 |
| LC8 | 2.8 | 0.6 |
| LC9 | 4.9 | 0.5 |
| LC10 | 2.9 | 0.5 |

The following results are obtained for devices containing the reference mixtures:

| Device containing | ΔE* after light exposure test | ΔE* after heat exposure test |
|---|---|---|
| V-LC1 | 17.6 | 0.3 |
| V-LC2 | 15.1 | 0.15 |
| V-LC3 | 18.8 | n.d. |
| V-LC4 | 15.9 | n.d. |
| M1-F (without additives) | 23.0 | n.d. |

The results obtained show that good values for the colour difference $\Delta E^*$ are obtained in the light exposure test for the devices which contain mixtures comprising additive A1 (LC1 to LC5).

Relatively good values for the colour difference $\Delta E^*$ are also obtained in the heat stability test with additive A1.

By contrast, very poor, unacceptable values for the colour difference $\Delta E^*$ are obtained in the light exposure test for the reference devices which contain mixtures comprising additives A2, A3 or A4 (V-LC1 to V-LC4). The same applies to mixture M1-F without stabilising additives.

Very good values for the colour difference $\Delta E^*$, both in the light stability test and also in the heat stability test, are obtained with devices which contain both additives A1 and A2 (LC6 to LC10). These again exceed the good values obtained with additive A1 alone.

The invention claimed is:

1. A liquid-crystalline material comprising:
   i.) at least three different dyes,
   ii.) a compound (I) containing a group of the formula (1),
   iii.) a compound (II) of formula (2)
   wherein said group of formula (1) is:

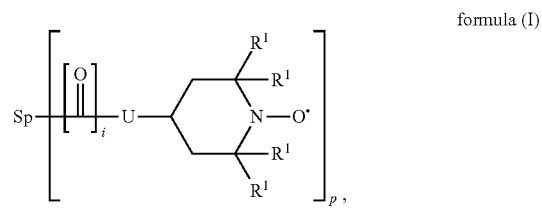

formula (I)

where

U is selected on each occurrence, identically or differently, from —$CH_2$—, —O—, —S— and —NH—;

Sp is selected from alkylene groups having 2 to 10 C atoms, which may in each case be substituted by one or more radicals $R^4$, alkenylene groups having 2 to 10 C atoms, which may in each case be substituted by one or more radicals $R^4$, alkynylene groups having 2 to 10 C atoms, which may in each case be substituted by one or more radicals $R^4$, aryl groups having 6 to 40 aromatic ring atoms, which may in each case be substituted by one or more radicals $R^4$, and heteroaryl groups having 5 to 40 aromatic ring atoms, which may in each case be substituted by one or more radicals $R^4$;

$R^1$ is selected on each occurrence, identically or differently, from $Si(R^3)_3$ and alkyl groups having 1 to 12 C atoms, which may be substituted by one or more radicals selected from F, Cl and CN;

$R^3$ is on each occurrence, identically or differently, H, D, F, CN, alkyl or alkoxy groups having 1 to 20 C atoms, alkenyl or alkynyl groups having 2 to 20 C atoms, aryl groups having 6 to 40 aromatic ring atoms or a heteroaryl groups having 5 to 40 aromatic ring atoms; where two or more radicals $R^3$ may be linked to one another and may form a ring; and where the said alkyl, alkoxy, alkenyl and alkynyl groups, aryl groups and heteroaryl groups may be substituted by F or CN;

$R^4$ is selected on each occurrence, identically or differently, from H, D, F, CN, alkyl or alkoxy groups having 1 to 20 C atoms, alkenyl or alkynyl groups having 2 to 20 C atoms, aryl groups having 6 to 40 aromatic ring atoms and heteroaryl groups having 5 to 40 aromatic ring atoms; where two or more radicals $R^3$ may be linked to one another and may form a ring; and where the said alkyl, alkoxy, alkenyl and alkynyl groups, aryl groups and heteroaryl groups may be substituted by F or CN;

i is on each occurrence, identically or differently, 0 or 1;

p is equal to 2, 3 or 4 and wherein said compound of formula (2) is:

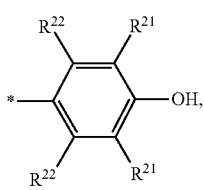

formula (2)

where the bond marked by * is the bond by means of which the group is connected to the remainder of the compound, and where $R^{21}$ is selected on each occurrence, identically or differently, from H; silyl groups which carry radicals selected from alkyl groups having 1 to 12 C atoms and aryl groups having 6 to 40 aromatic ring atoms; and alkyl groups having 1 to 12 C atoms, which may be substituted by one or more radicals selected from F, Cl and CN, where at least one $R^{21}$ is selected from silyl groups which carry radicals selected from alkyl groups having 1 to 12 C atoms and aryl groups having 6 to 40 aromatic ring atoms; and alkyl groups having 1 to 12 C atoms, which may be substituted by one or more radicals selected from F, Cl and CN; and where $R^{22}$ is selected on each occurrence, identically or differently, from H and alkyl groups having 1 to 12 C atoms, which may be substituted by one or more radicals selected from F, Cl and CN.

2. The liquid-crystalline material according to claim 1, wherein in group of formula (I)

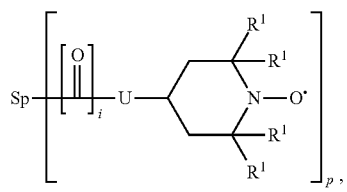

formula (I)

U is on each occurrence, identically or differently, from —CH$_2$—, —O—, or —NH—;

Sp is an alkylene group having 2 to 10 C atoms, which may in each case be substituted by one or more radicals $R^4$, alkenylene groups having 2 to 10 C atoms, which may in each case be substituted by one or more radicals $R^4$, alkynylene groups having 2 to 10 C atoms, which may in each case be substituted by one or more radicals $R^4$, aryl groups having 6 to 40 aromatic ring atoms, which may in each case be substituted by one or more radicals $R^4$, or a heteroaryl groups having 5 to 40 aromatic ring atoms, which may in each case be substituted by one or more radicals $R^4$;

$R^1$ is on each occurrence, identically or differently, an alkyl groups having 1 to 12 C atoms, which may be substituted by one or more radicals selected from F, Cl or CN;

$R^4$ is on each occurrence, identically or differently, from H, D, F, CN, alkyl or alkoxy groups having 1 to 20 C atoms, alkenyl or alkynyl groups having 2 to 20 C atoms, aryl groups having 6 to 40 aromatic ring atoms or heteroaryl groups having 5 to 40 aromatic ring atoms; where two or more radicals $R^3$ may be linked to one another and may form a ring; and where the said alkyl, alkoxy, alkenyl and alkynyl groups, aryl groups and heteroaryl groups may be substituted by F or CN;

i is 1;

p is equal to 2, 3 or 4.

3. The liquid-crystalline material according to claim 1, wherein the compound (I) is present in the liquid-crystalline material in a proportion of 0.01% by weight to 1% by weight.

4. The liquid-crystalline material according to claim 1, wherein the liquid-crystalline material comprises at least one compound which contains at least one group selected from the following:

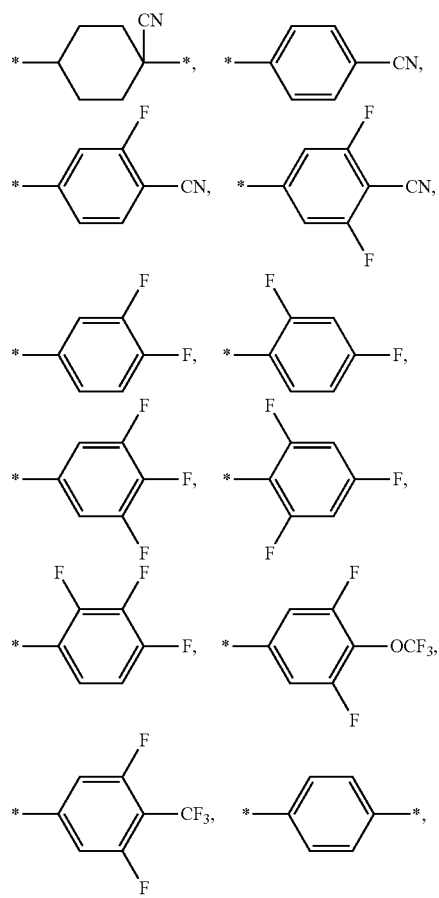

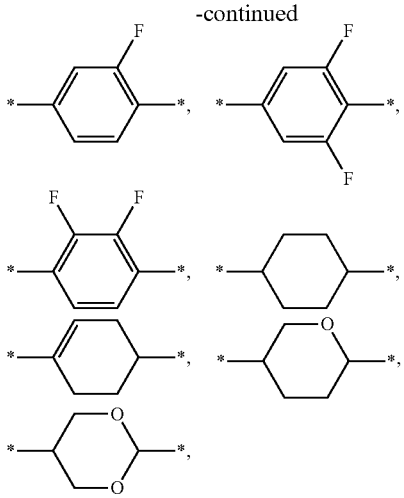

where the bond marked by * is the bond by means of which the group is connected to the remainder of the compound.

5. The liquid-crystalline material according to claim 1, wherein the compound (II) contains a group of the formula (2)

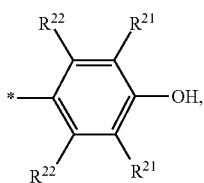

formula (2)

where the bond marked by * is the bond by means of which the group is connected to the remainder of the compound, and
where $R^{21}$ is on each occurrence, identically or differently, H; an alkyl groups having 1 to 12 C atoms, which may be substituted by one or more radicals selected from F, Cl and CN, where at least one $R^{21}$ is an aryl groups having 6 to 40 aromatic ring atoms; or an alkyl groups having 1 to 12 C atoms, which may be substituted by one or more radicals selected from F, Cl and CN; and
where $R^{22}$ is selected on each occurrence, identically or differently, from H and alkyl groups having 1 to 12 C atoms, which may be substituted by one or more radicals selected from F, Cl and CN.

6. The liquid-crystalline material according to claim 1, wherein the compound (II) is present in the liquid-crystalline material in a proportion of 0.01% by weight to 1% by weight.

7. The liquid-crystalline material according to claim 1, wherein at least one of said dyes is a dichroic dye.

8. The liquid-crystalline material according to claim 1, wherein the liquid-crystalline material comprises at least three different dyes and at least two of said dyes cover different regions of the light spectrum.

9. The liquid-crystalline material according to claim 1, wherein at least one of said dyes is an azo compound, an anthraquinone, a methine compound, an azomethine compound, a merocyanine compound, a naphthoquinone, a tetrazine, a rylene, a benzothiadiazole, a pyrromethene or a diketopyrrolopyrrole.

10. A method which comprises including the liquid-crystalline material according to claim 1 in a layer of a switchable window.

11. Optical switching device for regulation of the passage of sunlight, containing a layer comprising a liquid-crystalline material according to claim 1.

12. Optical switching device according to claim 11, characterised in that it comprises the following layer sequence:
polarisation layer
substrate layer
electrically conductive transparent layer
alignment layer
switching layer comprising the liquid-crystalline material
alignment layer
electrically conductive transparent layer
substrate layer,
where the polarisation layer faces the sun.

13. The liquid-crystalline material according to claim 5, wherein at least one $R^{21}$ is an alkyl groups having 1 to 12 C atoms.

14. The liquid-crystalline material according to claim 5, wherein at least one $R^{22}$ is H.

15. The liquid-crystalline material according to claim 2, wherein U is —$CH_2$—.

16. The liquid-crystalline material according to claim 2, wherein $R^1$ is alkyl groups having 1 to 12 C atoms.

17. The liquid-crystalline material according to claim 1, wherein said dyes are positively dichroic dyes.

* * * * *